United States Patent
Wu et al.

(10) Patent No.: US 12,362,392 B2
(45) Date of Patent: Jul. 15, 2025

(54) BATTERY CELL, BATTERY, AND ELECTRIC APPARATUS

(71) Applicant: CONTEMPORARY AMPEREX TECHNOLOGY (HONG KONG) LIMITED, Hong Kong (HK)

(72) Inventors: Zeli Wu, Ningde (CN); Changlong Han, Ningde (CN); Cuiping Zhang, Ningde (CN); Lei Huang, Ningde (CN); Jie Guo, Ningde (CN); Shuting Peng, Ningde (CN); Qiao Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/883,963

(22) Filed: Sep. 12, 2024

(65) Prior Publication Data

US 2025/0140925 A1  May 1, 2025

Related U.S. Application Data

(63) Continuation of application No. PCT/CN2024/084136, filed on Mar. 27, 2024.

(30) Foreign Application Priority Data

Oct. 30, 2023 (CN) .......................... 202311421105.X

(51) Int. Cl.
*H01M 10/0568* (2010.01)
*H01M 4/587* (2010.01)
(Continued)

(52) U.S. Cl.
CPC ....... *H01M 10/0568* (2013.01); *H01M 4/587* (2013.01); *H01M 10/0525* (2013.01);
(Continued)

(58) Field of Classification Search
None
See application file for complete search history.

(56) References Cited

U.S. PATENT DOCUMENTS

2015/0280208 A1  10/2015 Kimura et al.
2016/0087311 A1  3/2016 Doelle et al.
(Continued)

FOREIGN PATENT DOCUMENTS

CN   109417200 A   3/2019
CN   109921092 A   6/2019
(Continued)

OTHER PUBLICATIONS

The World Intellectual Property Organization (WIPO) International Search Report for PCT/CN2024/086708 Jun. 28, 2024 5 Pages (including translation).
(Continued)

*Primary Examiner* — Wyatt P McConnell
(74) *Attorney, Agent, or Firm* — ANOVA LAW GROUP, PLLC

(57) ABSTRACT

A battery cell includes an electrolyte, positive and negative electrode plates, and a separator provided between the positive and negative electrode plates. The electrolyte includes a lithium salt including lithium hexafluorophosphate, a mass percentage of which with respect to a total mass of the electrolyte ranges from 15% to 20%. The positive/negative electrode plate includes a positive/negative electrode current collector and a positive/negative electrode film layer provided on at least one side of the positive/negative electrode current collector and containing a positive/negative electrode active material. The negative electrode active material contains carbon and silicon. A mass percentage of silicon with respect to a total mass of the (Continued)

negative electrode active material is greater than or equal to 0.3% and less than or equal to 3.0%.

20 Claims, 3 Drawing Sheets

(51) Int. Cl.
    *H01M 10/0525*     (2010.01)
    *H01M 10/0567*     (2010.01)
    *H01M 10/0569*     (2010.01)
    *H01M 4/02*     (2006.01)

(52) U.S. Cl.
    CPC ... *H01M 10/0567* (2013.01); *H01M 10/0569* (2013.01); *H01M 2004/027* (2013.01); *H01M 2300/0034* (2013.01); *H01M 2300/0042* (2013.01)

(56) References Cited

U.S. PATENT DOCUMENTS

| | | | |
|---|---|---|---|
| 2018/0309169 A1 | 10/2018 | Yang et al. | |
| 2018/0358610 A1 | 12/2018 | Shimanuki et al. | |
| 2019/0058218 A1 | 2/2019 | Koh et al. | |
| 2021/0384500 A1* | 12/2021 | Wang | H01M 4/621 |
| 2023/0216089 A1* | 7/2023 | Guo | H01M 4/133 |
| | | | 429/332 |

FOREIGN PATENT DOCUMENTS

| | | |
|---|---|---|
| CN | 110875497 A | 3/2020 |
| CN | 110943215 A | 3/2020 |
| CN | 112582676 A | 3/2021 |
| CN | 113207318 A | 8/2021 |
| CN | 114024034 A | 2/2022 |
| CN | 114142007 A | 3/2022 |
| CN | 114245943 A | 3/2022 |
| CN | 115548444 A | 12/2022 |
| CN | 116130768 A | 5/2023 |
| CN | 116315090 A | 6/2023 |
| CN | 116344941 A | 6/2023 |
| CN | 116454392 A | 7/2023 |
| CN | 116565322 A | 8/2023 |
| CN | 116670844 A | 8/2023 |
| CN | 116759711 A | 9/2023 |
| CN | 116802871 A | 9/2023 |
| CN | 117154187 A | 12/2023 |
| CN | 117154188 A | 12/2023 |
| CN | 117936722 A | 4/2024 |
| CN | 118435407 A | 8/2024 |
| JP | 2014082075 A | 5/2014 |
| WO | 2021023131 A1 | 2/2021 |
| WO | 2022268147 A1 | 12/2022 |

OTHER PUBLICATIONS

China National Intellectual Property Administration (CNIPA) Office Action 1 for Application No. 202311421105.X Dec. 5, 2023 15 Pages (including translation).
China National Intellectual Property Administration (CNIPA) Office Action 3 for Application No. 202311421105.X Jan. 9, 2024 13 Pages (including translation).
State Intellectual Property Office of China Notice of Grant of Invention Patent Right for Application No. 202311421105.X Apr. 8, 2024 6 pages (including translation).
XC Wei, RA of CEVC7-250Ah-BEV, Jul. 2022.
United States Patent and Trademark Office (USPTO) Non-final Rejection for U.S. Appl. No. 18/883,979 Dec. 4, 2024 15 Pages.
State Intellectual Property Office of China First Office Action for Application No. 202480001150.6 Nov. 29, 2024 10 pages (including translation).
The Japan Patent Office (JPO) Notice of Reasons for Refusal for Application No. 2024-543853 Jun. 2, 2025 9 Pages (including translation).
The Japan Patent Office (JPO) Notice of Reasons for Refusal for Application No. 2024-543854 Jun. 2, 2025 9 Pages (including translation).

* cited by examiner

BATTERY CELL, BATTERY, AND ELECTRIC APPARATUS

CROSS-REFERENCE TO RELATED APPLICATIONS

This application is a continuation of International Application No. PCT/CN2024/084136, filed on Mar. 27, 2024, which claims priority to Chinese Patent Application No. 202311421105.X, filed on Oct. 30, 2023 and entitled "BATTERY CELL, BATTERY, AND ELECTRIC APPARATUS", the entire contents of both of which are incorporated herein by reference.

TECHNICAL FIELD

This application relates to the field of rechargeable and dischargeable batteries, and in particular to a battery cell, a battery, and an electric apparatus.

BACKGROUND

Battery cells have characteristics such as high capacity and long service life, and thus are widely used in electronic devices such as mobile phones, laptop computers, electric bicycles, electric vehicles, electric aircrafts, electric ships, electric toy cars, electric toy ships, electric toy aircrafts, and electric tools. As great progress has been made in the field of batteries, higher requirements have been placed on the performance of battery cells.

However, currently, battery cells exhibit poor discharge power in the later stage of discharge.

SUMMARY

This application provides a battery cell, a battery, and an electric apparatus. The discharge power of the battery cell described in this application can be improved in the later stage of discharge.

According to a first aspect, an embodiment of this application provides a battery cell. The battery cell includes an electrolyte, a positive electrode plate, a negative electrode plate, and a separator. The electrolyte includes a lithium salt, where the lithium salt includes lithium hexafluorophosphate, and a mass percentage of the lithium hexafluorophosphate with respect to a total mass of the electrolyte ranges from 15% to 20%. The positive electrode plate includes a positive electrode current collector and a positive electrode film layer provided on at least one side of the positive electrode current collector and containing a positive electrode active material. The negative electrode plate includes a negative electrode current collector and a negative electrode film layer provided on at least one side of the negative electrode current collector and containing a negative electrode active material, where the negative electrode active material further contains element carbon and element silicon, and a mass percentage of the element silicon with respect to a total mass of the negative electrode active material is greater than or equal to 0.3% and less than or equal to 3.0%. The separator is provided between the positive electrode plate and the negative electrode plate.

Thus, this embodiment of this application can reduce the internal resistance of the battery at the end of discharge and improve the discharge power performance by regulating the percentage of silicon in the negative electrode active material (where the mass percentage of the element silicon is not less than 0.3% and less than or equal to 3.0%) and using an appropriate electrolyte system (where the mass percentage of the lithium hexafluorophosphate ranges from 15% to 20%).

In some embodiments, the element silicon in the negative electrode active material exists in the negative electrode film layer in a form of at least one of silicon elementary substance, silicon-carbon composite, and silicon oxide $SiO_x$ ($0<x\leq2$).

In some embodiments, the negative electrode active material further includes at least one of artificial graphite and natural graphite containing element carbon.

In some embodiments, the element silicon in the negative electrode active material exists in the negative electrode film layer in a form of silicon oxide $SiO_x$ ($x=1$), and the negative electrode active material further includes artificial graphite containing element carbon. Optionally, based on the total mass of the negative electrode active material, a ratio of a mass percentage of the silicon oxide to a percentage of the artificial graphite ranges from (0.50:99.5) to (5:95). With the negative electrode active material satisfied the foregoing ratio of the percentage of the silicon oxide to the percentage of the artificial graphite, the discharge power of the battery at low SOC can be further improved.

In some embodiments, based on the total mass of the negative electrode active material, a mass percentage of the silicon oxide $SiO_x$ ranges from 2.0% to 3.5%. With the mass percentage of the silicon oxide $SiO_x$ satisfied the foregoing range, the discharge power at low SOC can be further improved.

In some embodiments, the electrolyte further includes a cyclic carbonate, where based on the total mass of the electrolyte, a ratio of a mass percentage of the cyclic carbonate to a mass percentage of the lithium hexafluorophosphate is (0.60 to 2.50):1, and optionally, (1.00 to 1.65):1. The possible beneficial effects are speculated as follows: With the ratio of the mass percentage of the cyclic carbonate to the mass percentage of the lithium hexafluorophosphate fell within the foregoing range, it is conducive to fully dissociating more lithium ions from the lithium hexafluorophosphate, so that even at the end of discharge at low SOC, the electrolyte system can still contain more lithium ions, and the lithium ions can be continuously dissociated as the battery reaction proceeds, thereby improving the power performance of the battery.

In some embodiments, the mass percentage of the cyclic carbonate ranges from 10% to 41%, and optionally, from 20% to 30%. The cyclic carbonate has a high dielectric constant and high ionic conductivity, and thus can form a stable SEI film on the surface of the negative electrode active material, which is conducive to the power performance of the battery at the end of discharge.

In some embodiments, the cyclic carbonate includes at least one of ethylene carbonate EC, propylene carbonate PC, and butylene carbonate BC.

In some embodiments, the electrolyte further includes a linear carbonate, where based on the total mass of the electrolyte, a ratio of a mass percentage of the linear carbonate to the mass percentage of the cyclic carbonate is (0.9 to 6):1, and optionally, (1.5 to 2.65):1. With the ratio of the mass percentage of the linear carbonate to the mass percentage of the cyclic carbonate satisfied the foregoing range, the viscosity and ionic conductivity of the electrolyte can be increased, and the kinetic performance of lithium ions can be improved.

In some embodiments, the mass percentage of the linear carbonate ranges from 35% to 65%; and/or the linear carbonate includes at least one of ethyl methyl carbonate EMC, diethyl carbonate DEC, and dimethyl carbonate DMC. The linear carbonate has a relatively low viscosity, which helps sufficient dissolution of the lithium hexafluorophosphate of a high percentage, and facilitates the rapid migration of lithium ions dissociated from the lithium hexafluorophosphate between the positive and negative electrodes. Additionally, the combined use of the linear carbonate and the cyclic carbonate also helps to increase the electrochemical stability of the electrolyte system and effectively reduces side reactions of the electrolyte.

In some embodiments, the electrolyte further includes a fluorinated cyclic carbonate. The fluorinated cyclic carbonate can participate in the formation of the SEI film on the surface of the negative electrode active material, improving the components and characteristics of the film, and effectively protecting the negative electrode active material, especially in the presence of silicon in the negative electrode. Due to the expansion characteristics of silicon, optimization of the components of the SEI film is more desired. The optimization of the film components is achieved by regulating the relative proportion of a film-forming additive in the electrolyte. The film formed with the participation of the fluorinated cyclic carbonate can enhance the flexibility of the SEI film, alleviate the structural collapse caused by the release of a large number of lithium ions in a short period of time at the end of discharge. Additionally, the fluorinated cyclic carbonate has a certain desolvation ability, which is beneficial for the migration of lithium ions, improving the DCR at low SOC, and enhancing discharge power.

In some embodiments, the fluorinated cyclic carbonate includes at least one of monofluoroethylene carbonate FEC, difluoroethylene carbonate DFEC, and trifluoropropylene carbonate TFPC; and optionally, the fluorinated cyclic carbonate includes monofluoroethylene carbonate FEC.

In some embodiments, a ratio of a mass percentage of the fluorinated cyclic carbonate with respect to the total mass of the electrolyte to a mass percentage of the element silicon is (0.5 to 9.5):1, and optionally, (1 to 2):1.

In some embodiments, based on the total mass of the electrolyte, the ratio of the mass percentage of the fluorinated cyclic carbonate to the mass percentage of the lithium salt is (0.05 to 0.30):1, and optionally, (0.10 to 0.20):1. With the ratio of the mass percentage of the fluorinated cyclic carbonate to the mass percentage of the lithium salt fell within the foregoing range, the DCR can be reduced on the basis of improving the flexibility, ionic conductivity, and electronic conductivity of the SEI film, thereby enhancing the discharge power of the battery.

In some embodiments, the lithium salt further includes at least one of fluorine-containing inorganic phosphate and fluorine-containing inorganic borate. The fluorine-containing inorganic phosphate and the fluorine-containing inorganic borate can participate in the formation of inorganic components in the SEI film, which helps to improve the ionic and electronic conductivity of the SEI film, and the formed SEI film has lower interfacial ion impedance, which is conducive to the transport of lithium ions and can improve the DCR at low SOC.

In some embodiments, based on the total mass of the electrolyte, a mass percentage of the fluorine-containing inorganic phosphate or fluorine-containing inorganic borate ranges from 0.05% to 0.50%, and optionally, from 0.10% to 0.30%.

In some embodiments, the fluorine-containing inorganic phosphate includes lithium difluorophosphate $LiPO_2F_2$; and/or the fluorine-containing inorganic borate includes at least one of lithium tetrafluoroborate $LiBF_4$ and lithium difluorooxalatoborate LiDFOB.

In some embodiments, the electrolyte further includes an additive, where the additive includes at least one of 1,3-propane sultone PS, vinylene carbonate VC, and lithium fluosulfonate $LiSO_3F$; and based on the total mass of the electrolyte, a ratio of a mass percentage of the 1,3-propane sultone PS, a mass percentage of the vinylene carbonate VC, and a mass percentage of the lithium fluosulfonate $LiSO_3F$ is (0.050 to 0.300):(0.100 to 0.500):(0.001 to 0.300). With the ratio of the mass percentage of the 1,3-propane sultone PS, the mass percentage of the vinylene carbonate VC, and the mass percentage of the lithium fluosulfonate $LiSO_3F$ fell within the foregoing range, these components can basically participate in the formation of the SEI film on the surface of the negative electrode active material, allowing the SEI film to effectively alleviate the expansion of the silicon-based material.

In some embodiments, the mass percentage of the 1,3-propane sultone PS ranges from 0.1% to 1.0%; and/or the mass percentage of the vinylene carbonate VC ranges from 0.1% to 1.0%; and/or the mass percentage of the lithium fluosulfonate $LiSO_3F$ ranges from 0.1% to 1.0%.

In some embodiments, the battery cell has an electrolyte retention coefficient of 1 g/Ah to 2.5 g/Ah, and optionally, from 1.8 g/Ah to 2.2 g/Ah. The electrolyte retention coefficient of the battery cell can reflect the electrolyte retention capacity. With the electrolyte retention coefficient of the battery cell fell within the foregoing range, the electrolyte can provide good wetting for the positive electrode plate and the negative electrode plate. Additionally, there is a certain gap between the negative electrode plate and the separator, which can provide expansion space for the volume expansion of the silicon-based material, and reduce the risk of swelling of the overall battery.

In some embodiments, the separator has a porosity of 30% to 40%. In the battery cell of this application, the lithium hexafluorophosphate has a relatively high addition amount, the electrolyte has relatively high overall viscosity, and the separator has a relatively high porosity, which is conducive to the electrolyte with a relatively higher viscosity to pass through the separator, allowing lithium ions to migrate smoothly.

In some embodiments, the separator includes an organic substrate and a coating provided on at least one side of the organic substrate, where the coating includes a heat-resistant layer and an organic layer, the heat-resistant layer is provided on a surface of the organic substrate, and the organic layer is provided on a surface of the heat-resistant layer facing away from the organic substrate.

In some embodiments, the separator includes an organic substrate and a coating provided on at least one side of the organic substrate, where the coating includes a ceramic layer and/or a polyacrylate layer, optionally, the coating includes a ceramic layer and a polyacrylate layer, and optionally, the ceramic layer is provided on a surface of the organic substrate; and the polyacrylate layer is provided on a surface of the ceramic layer facing away from the organic substrate. In the separator, the polyacrylate layer is provided on the outer surface of the separator, so that the separator has a certain flexibility on the outer surface, which can effectively alleviate the volume expansion or contraction of the silicon-based material, enhancing the overall structural stability of the electrode assembly.

In some embodiments, the organic substrate has a thickness of 6.6 μm to 7.6 μm. With the thickness of the organic substrate fell within the foregoing range, the transport rate of lithium ions in the negative electrode plate and the transport rate of lithium ions in the separator are basically the same, reducing the risk of deteriorating salinity gradient polarization, and improving discharge performance.

In some embodiments, the coating has a thickness of 1.5 µm to 2.5 µm. With the thickness of the coating fell within the foregoing range, the transport rate of lithium ions in the negative electrode plate and the transport rate of lithium ions in the separator are basically the same, reducing the risk of deteriorating salinity gradient polarization, and improving discharge performance.

According to a second aspect, this application further provides a battery, where the battery includes the battery cell according to any one of the embodiments of the first aspect.

According to a third aspect, this application further provides an electric apparatus, including the battery according to the second aspect of this application.

DESCRIPTION OF DRAWINGS

To describe the technical solutions in embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

Figure 1:
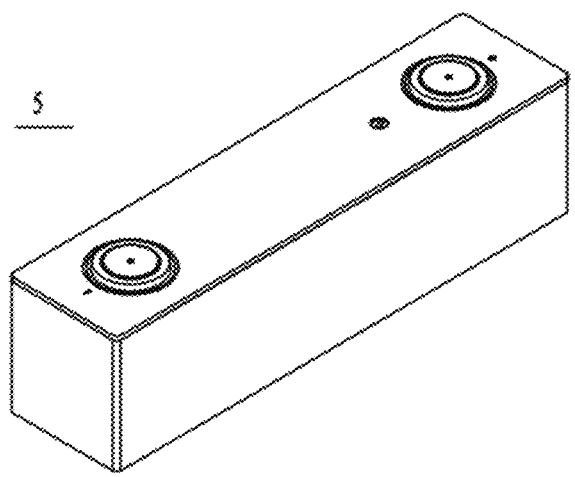
FIG. 1 is a schematic diagram of an embodiment of a battery cell in this application.

The figures are not necessarily drawn to scale.

REFERENCE SIGNS 1. battery pack; 2. upper box body; 3. lower box body; 4. battery module;
5. battery cell; 51. housing; 52. electrode assembly;
53. cover plate; and
6. electric apparatus.

DESCRIPTION OF EMBODIMENTS

Embodiments that specifically disclose a battery cell, a battery, and an electric apparatus in this application are described in detail below with reference to the accompanying drawings as appropriate. However, there may be cases where unnecessary detailed descriptions are omitted. For example, detailed descriptions of well-known matters and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits. A given range is defined by one lower limit and one upper limit selected, where the selected lower and upper limits define boundaries of that particular range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed in the order described or in random order, in some embodiments, in the order described. For example, a method including steps (a) and (b) indicates that the method may include steps (a) and (b) performed in order or may include steps (b) and (a) performed in order. For example, the foregoing method may further include step (c), which indicates that step (c) may be added to the method in any ordinal position, for example, the method may include steps (a), (b), and (c), steps (a), (c), and (b), steps (c), (a), and (b), or the like.

In this disclosure, the phrases "at least one of A, B, and C" and "at least one of A, B, or C" both mean only A, only B, only C, or any combination of A, B, and C.

The discharge of a lithium-ion battery is a process in which lithium ions are deintercalated from the negative electrode active material, pass through the electrolyte, and are intercalated into the positive electrode active material. In the battery field, the industry commonly uses the "state of charge (state of charge, SOC for short)" to reflect the remaining capacity after battery discharge. The value of SOC is defined as a percentage of the remaining capacity to the battery capacity, ranging from 0 to 100%. "SOC-0" indicates that the battery is fully discharged, and "SOC=100%" indicates that the battery is fully charged.

There is a problem of insufficient "discharge power" in the later stage of the discharge process of lithium-ion batteries. For example, when the battery discharges to a state of charge (SOC) ≤10% and continues to discharge to 0%, the discharge power performance is reduced compared to the earlier discharge stage, reducing the power performance of the entire discharge process.

In view of the above problems, this application proposes a battery cell. The battery cell includes a negative electrode plate conducive to improving the discharge power of the battery in the later stage of discharge, based on this negative electrode plate, matched with an electrolyte conducive to improving the discharge power of the battery in the later stage of discharge, and may further include an adaptive separator and positive electrode plate. The power performance of the battery in the later stage of discharge (especially in the discharge process from 10% SOC to 0% SOC) is significantly improved.

Battery Cell

According to a first aspect, an embodiment of this application provides a battery cell, where the battery cell includes a positive electrode plate, a separator, a negative electrode plate, and an electrolyte. The positive electrode plate includes a positive electrode current collector and a positive electrode film layer provided on at least one side of the positive electrode current collector and containing a positive electrode active material. The electrolyte includes a lithium salt, where the lithium salt includes lithium hexafluorophosphate, and a mass percentage of the lithium hexafluorophosphate with respect to a total mass of the electrolyte ranges from 15% to 20%. The negative electrode plate includes a negative electrode current collector and a negative electrode film layer provided on at least one side of the negative electrode current collector and containing a negative electrode active material. The negative electrode active material further contains element carbon and element silicon, where a mass percentage of the element silicon with respect to a total mass of the negative electrode active material is greater than or equal to 0.3% and less than or equal to 3.0%.

The negative electrode active material of the battery cell includes a carbon-based material providing element carbon and a silicon-based material providing element silicon. The carbon-based material providing the element carbon may contain element carbon, or may also contain element silicon, or certainly may contain only element carbon. The silicon-based material providing the element silicon may contain element silicon, or may also contain element carbon, or certainly may contain only element silicon. The negative electrode active material includes both the carbon-based material and the silicon-based material, with the mass percentage of the element silicon with respect to the total mass of the negative electrode active material being not less than 0.3%. Considering the following reason: As compared with the carbon-based material, the silicon-based material has a higher voltage platform in lithium intercalation and deintercalation. Therefore, even at low SOC (for example, SOC ≤10%), the silicon-based material can still continue to participate in discharge, so as to make up for the deficiency that the carbon-based material is difficult/unable to continue discharging at low SOC, improving the direct current internal resistance DCR of the battery during discharge, and thereby improving the discharge power performance of the battery during discharge.

In the battery cell of this application, the negative electrode active material mainly contains the carbon-based material, with a small amount of the silicon-based material added, in other words, in the negative electrode active material, the mass percentage of the element silicon is less than the mass percentage of the element carbon, and the mass percentage of the element silicon in the silicon-based material with respect to the total mass of the negative electrode active material is less than or equal to 3.0%. Considering the following reason: Although the potential of the silicon-based material in lithium intercalation and deintercalation is higher than that of the carbon-based material, its volume expansion or contraction during charge and discharge is relatively large, which may lead to undesirable issues such as structural collapse, cracking, and pulverization of the negative electrode active material, and then causes undesirable side reactions in the battery. In addition, because the conductivity of the silicon-based material is poor, excessive percentage is inconducive to improving DCR. Therefore, when other conditions are the same, the power performance of batteries corresponding to a negative electrode active material with a silicon percentage above 3.0% is actually worse than that of batteries with a lower silicon percentage.

To further alleviate the problem of cracking and pulverization of the silicon-based material, the battery cell of this embodiment of this application is used in combination with an electrolyte containing a high percentage of the lithium hexafluorophosphate $LiPF_6$, where a mass percentage of the lithium hexafluorophosphate with respect to a total mass of the electrolyte is above 15%.

The electrolyte containing a high percentage of the lithium hexafluorophosphate $LiPF_6$ can effectively alleviate the problem of cracking and pulverization of the silicon-based material. The possible reasons are as follows: The lithium hexafluorophosphate participates in the formation of components of a solid electrolyte interphase (Solid Electrolyte Interphase, SEI) film on the surface of the negative electrode active material, and the lithium hexafluorophosphate with a high fluorine atom ratio can optimize the components of the SEI film. The lithium hexafluorophosphate of a high mass percentage has a more significant improvement effect on the components of the SEI film, increasing the proportion of fluorine-lithium compounds (for example, lithium fluoride) in the SEI film. This SEI film with a high proportion of fluorine-lithium compounds can alleviate the problem of cracking and pulverization of the silicon-based material, enhancing the overall structural stability of the negative electrode active material, and delay side reactions between the electrolyte and the surface of the negative electrode active material, thereby improving the discharge stability of the silicon-based material at the end of discharge, and further enhancing the power performance of the battery.

Additionally, at the end of discharge at low SOC, the concentration of lithium ions in the negative electrode active material is relatively low, making it difficult for lithium ions to be deintercalated from the negative electrode active material, reducing the salinity gradient of the lithium salt in the electrolyte system, increasing the internal resistance of the battery cell, and further reducing discharge power. However, in this embodiment of this application, the electrolyte has a high percentage of the lithium hexafluorophosphate, and therefore can contribute more lithium ions to the battery system to increases the concentration of lithium ions in the electrolyte, effectively reducing the salinity gradient polarization of the lithium salt, promoting the migration of lithium ions from the negative electrode plate to the positive electrode plate, and further enhancing the power performance of the battery cell.

However, under the condition that the mass percentage of the lithium hexafluorophosphate in the electrolyte is greater than 20%, the viscosity of the electrolyte increases significantly, which is not conducive to the migration of lithium ions from the bulk phase of the negative electrode active material to the surface of the negative electrode active material, and the rate of lithium ions migrating from the surface of the negative electrode to the surface of the positive electrode slows down, which is not conducive to the migration of lithium ions from the surface of the negative electrode active material to the bulk phase of the negative electrode active material. Even if the negative electrode active material contains a silicon material with a high lithium intercalation and deintercalation voltage platform, without an appropriate electrolyte system, the internal resistance of the battery at the end of discharge still increases, adversely affecting discharge power performance.

In summary, in the battery cell of this embodiment of this application, the mass percentage of the lithium hexafluorophosphate in the electrolyte ranges from 15% to 20%. The combined use of such lithium hexafluorophosphate and the element silicon in the negative electrode active material of a mass percentage of 0.3% to 3.0% can improve the power performance of the battery at the end of discharge under the synergistic effect of the electrolyte and the negative electrode.

For example, the mass percentage of the lithium hexafluorophosphate with respect to the total mass of the electrolyte may be 15%, 15.5%, 16%, 16.5%, 17%, 17.5%, 18%, 18.2%, 18.5%, 19%, 19.5%, 20%, or in a range defined by any two of these values. The mass percentage of the element silicon in the corresponding negative electrode active material with respect to the total mass of the negative electrode active material ranges from 0.3% to 3.0%, for example, 0.3%, 0.32%, 0.4%, 0.5%, 0.6%, 0.64%, 0.7%, 0.8%, 0.9%, 1.0%, 1.1%, 1.2%, 1.27%, 1.3%, 1.4%, 1.5%, 1.6%, 1.7%, 1.8%, 1.9%, 1.91%, 2.0%, 2.1%, 2.2%, 2.23%, 2.3%, 2.4%, 2.5%, 2.6%, 2.7%, 2.8%, 2.86%, 2.9%, 3%, or in a range defined by any two of these values.

As mentioned above, the element silicon can come from the silicon-based material, where the silicon-based material may be a raw material for forming the negative electrode film layer. In some embodiments, the element silicon contained in the negative electrode active material exists in a form of at least one of silicon elementary substance, silicon-carbon composite, or silicon oxide $SiO_x$ ($0<x\leq2$) in the negative electrode film layer. Herein, the silicon elementary substance, the silicon-carbon composite, and the silicon oxide $SiO_x$ ($0<x\leq2$) can refer to both the silicon-based material and the form of element silicon in the negative electrode plate of the battery after formation. In the silicon oxide $SiO_x$ $0<x\leq2$ indicates the various combinations of silicon and oxygen atoms in the negative electrode film layer. The silicon oxide may be at least one of $SiO$, $SiO_{1.2}$, $SiO_2$, and other possible silicon oxides. The silicon-carbon composite herein may be a silicon-carbon composite produced by certain chemical reactions between the element silicon and the element carbon in a battery cell.

The main component of the carbon-based material is the element carbon. In some embodiments, the carbon-based material may include at least one of artificial graphite and natural graphite. Optionally, the carbon-based material may include artificial graphite. The combined use of such artificial graphite and the foregoing electrolyte system and silicon-carbon composite can reduce DCR and improve power performance.

Optionally, the carbon-based material may include natural graphite. The natural graphite generally has a smaller particle size, facilitating faster intercalation and deintercalation of lithium ions. The natural graphite usually contains amorphous carbon on the surface, and the presence of amorphous carbon can reduce DCR and improve power performance.

The qualitative and quantitative analysis of the substances or elements mentioned in this application can be performed using suitable equipment and methods known to those skilled in the art. For relevant testing methods, reference may be made to national and international testing standards and national and international enterprise standards. Those skilled in the art can also make adaptive changes to some testing steps or instrument parameters from the perspective of testing accuracy so as to obtain more accurate test results. One testing method may be used for qualitative or quantitative analysis, or several testing methods may be used in combination for qualitative or quantitative analysis.

For example, to detect the element silicon in the negative electrode active material, qualitative and quantitative analysis can be performed in accordance with JY/T015-1996 "General Rules for Inductively Coupled Plasma Atomic Emission Spectrometry". Further, surface elements or ion polishing cross-sectional elements of the negative electrode plate can be analyzed in accordance with GB-T17359-2012 standards.

For example, the graphite material in this application can be subjected to X-ray powder diffraction testing and qualitative analysis on the negative electrode plate or negative electrode active material in accordance with JIS/K0131-1996 "General Rules for X-ray Diffraction Analysis". The silicon elementary substance, silicon-carbon composite, and silicon oxide $SiO_x$ ($0<x\leq2$) in this application can also be subjected to the X-ray powder diffraction testing and qualitative analysis.

In some embodiments, based on the total mass of the negative electrode active material, a ratio of the mass percentage of the silicon oxide $SiO_x$ ($x=1$) to the mass percentage of the artificial graphite ranges from (0.5:99.5) to (5:95). With the negative electrode active material satisfied the foregoing ratio of the percentage of the silicon oxide to the percentage of the artificial graphite, the discharge power of the battery at low SOC can be further improved.

For example, the ratio of the mass percentage of the silicon oxide $SiO_x$ to the mass percentage of the artificial graphite may be 0.5:99.5, 1:99, 1.5:98.5, 2:98, 2.5:97.5, 3:97, 3.5:96.5, 4:96, 4.5:95.5, 5:95, or in a range defined by any two of these values.

In some embodiments, the mass percentage of the silicon oxide $SiO_x$ may range from 0.5% to 5%, and optionally from 2% to 3.5%, for example, 0.5%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, or in a range defined by any two of these values. With the mass percentage of the silicon oxide $SiO_x$ satisfied the foregoing range, the discharge power at low SOC can be further improved.

In some embodiments, the mass percentage of artificial graphite may range from 95% to 99.5%, and optionally from 96.5% to 98%, for example, 95%, 95.1%, 95.2%, 95.3%, 95.4%, 95.5%, 95.6%, 95.7%, 95.8%, 95.9%, 96%, 96.1%, 96.2%, 96.3%, 96.4%, 96.5%, 96.6%, 96.7%, 96.8%, 96.9%, 97%, 97.1%, 97.2%, 97.3%, 97.4%, 97.5%, 97.6%, 97.7%, 97.8%, 97.9%, 98%, 98.1%, 98.2%, 98.3%, 98.4%, 98.5%, 98.6%, 98.7%, 98.8%, 98.9%, 99%, 99.5%, or in a range defined by any two of these values. With the mass percentage of the artificial graphite satisfied the foregoing range, the cycling performance of the battery can be improved.

In some embodiments, based on a total mass of the negative electrode film layer, the mass percentage of the negative electrode active material is greater than or equal to 85% and less than 100%. For example, the mass percentage of the negative electrode active material may be 85%, 86%, 87%, 88%, 89%, 90%, 91%, 92%, 93%, 94%, 95%, 96%, 97%, 98%, 99%, or in a range defined by any two of these values.

In some embodiments, the single-sided negative electrode film layer has a thickness of 65 μm to 90 μm. The thickness of the negative electrode film layer refers to the thickness of the single-sided negative electrode film layer. For example, if the negative electrode current collector has the negative electrode film layers on two sides, the thickness of the negative electrode film layer on one side of the negative electrode current collector is the thickness of the single-sided negative electrode film layer. If the negative electrode current collector has the negative electrode film layer on only one side, the thickness of the negative electrode film layer on that side is the thickness of the single-sided negative electrode film layer. With the thickness of the negative electrode film layer fell within the foregoing range, the transport rate of lithium ions in the negative electrode plate and the transport rate of lithium ions in the separator can be basically the same, reducing the risk of deteriorating salinity gradient polarization and improving discharge performance.

For example, the thickness of the negative electrode film layer may be 65 μm, 66 μm, 67 μm, 68 μm, 69 μm, 70 μm, 71 μm, 72 μm, 73 μm, 74 μm, 75 μm, 76 μm, 77 μm, 78 μm, 79 μm, 80 μm, 81 μm, 82 μm, 83 μm, 84 μm, 85 μm, 86 μm, 87 μm, 88 μm, 89 μm, 90 μm, or in a range defined by any two of these values.

In the embodiments of this application, the thickness of the negative electrode film layer has a meaning known in the art and can be tested using equipment and methods known in the art. For relevant testing methods, reference may be made to national and international testing standards and national and international enterprise standards. Those skilled in the art can also make adaptive changes to some testing steps or instrument parameters from the perspective of testing accuracy so as to obtain more accurate test results. One testing method may be used for qualitative or quantitative analysis, or several testing methods may be used in combination for qualitative or quantitative analysis. For example, in accordance with GB/T 17359-2012 "Microbeam Analysis Energy Dispersive Spectroscopy", the thickness of the negative electrode film layer can be measured by taking the negative electrode plate without electrolyte as samples for ion polishing cross-sectional element analysis. For another example, measuring the average thickness with a micrometer: taking a negative electrode plate (a negative electrode plate coated with a negative electrode film layer on two sides) without electrolyte; measuring thicknesses of any five sites on the negative electrode plate with a micrometer first to obtain the average value H1; after cleaning the negative electrode film layer, measuring thicknesses of any five sites on the remaining current collector to obtain the average value H2; and obtaining the thickness of the single-sided negative electrode film layer, (H2-H1)/2.

In some embodiments, the negative electrode film layer has a pellet density PD of 1.3 g/cm$^3$ to 1.7 g/cm$^3$. With the pellet density of the negative electrode film layer fell within this range, the negative electrode plate is enabled to have good kinetic performance and cycling performance.

For example, the pellet density PD of the negative electrode film layer may be 1.3 g/cm$^3$, 1.35 g/cm$^3$, 1.4 g/cm$^3$, 1.45 g/cm$^3$, 1.5 g/cm$^3$, 1.55 g/cm$^3$, 1.6 g/cm$^3$, 1.65 g/cm$^3$, 1.7 g/cm$^3$, or in a range defined by any two of these values.

Surface density=weight of single-sided negative electrode film layer/area of single-sided negative electrode film layer, where because the negative electrode current collector has the negative electrode film layer on two sides, weight of single-sided negative electrode film layer=(average weight of the electrode plate-average weight of the current collector)/2. Pellet density=surface density/average thickness of the negative electrode film layer, where because the negative electrode current collector has the negative electrode film layer on two sides, and the average thickness of the negative electrode film layer=(average thickness of the electrode plate-average thickness of the current collector)/2.

The "average" herein may be the average value obtained after five parallel tests.

In some embodiments, the negative electrode film layer further optionally includes a negative electrode conductive agent. The negative electrode conductive agent is not limited to a particular type in these embodiments of this application. For example, the negative electrode conductive agent may include at least one of superconducting carbon, conductive graphite, acetylene black, carbon black, Ketjen black, carbon dots, carbon nanotubes, graphene, and carbon nanofiber. In some embodiments, based on the total mass of the negative electrode film layer, the mass percentage of the negative electrode conductive agent is ≤5%.

In some embodiments, the negative electrode film layer further optionally includes a negative electrode binder. The negative electrode binder is not limited to a particular type in these embodiments of this application. For example, the negative electrode binder may include styrene-butadiene rubber SBR, water-soluble unsaturated resin SR-1B, and water-based acrylic resin (for example, at least one of polyacrylic acid PAA, polymethacrylic acid PMAA, polyacrylic acid sodium PAAS, polyacrylamide PAM, polyvinyl alcohol PVA, sodium alginate SA, and carboxymethyl chitosan CMCS). In some embodiments, based on the total mass of the negative electrode film layer, the mass percentage of the negative electrode binder is ≤5%.

In some embodiments, the negative electrode film layer further optionally includes other adjuvants. For example, other adjuvants may include a thickener, such as sodium carboxymethyl cellulose CMC-Na or a PTC thermistor material. In some embodiments, based on the total mass of the negative electrode film layer, the mass percentage of the other adjuvants is ≤2%.

In some embodiments, the negative electrode current collector may be a metal foil current collector or a composite current collector. For example, a copper foil may be used as the metal foil. The composite current collector may include a polymer material matrix and a metal layer formed on at least one surface of the polymer material matrix. In an example, a metal material in the metal layer may include at least one of copper, copper alloy, nickel, nickel alloy, titanium, titanium alloy, silver, and silver alloy. For example, the polymer material matrix may include at least one of polypropylene (PP), polyethylene terephthalate (PET), polybutylene terephthalate (PBT), polystyrene (PS), and polyethylene (PE).

In some embodiments, the thickness of the negative electrode current collector is less than or equal to 6 μm; and optionally the negative electrode current collector is a thin current collector of 4.5 μm to 6 μm. For example, a thin metal current collector can be used.

The negative electrode current collector of the battery cell of this application is optionally a thin current collector with a thickness of 4.5 μm to 6 μm, so that the heat dissipation channel of the battery cell is weakened. The battery cell can retain some heat during low SOC discharge, further increasing the beneficial effect of combination of a low-silicon negative electrode plate with a high-percentage lithium hexafluorophosphate electrolyte system on reducing the DCR growth at the end of discharge (at low SOC), thereby improving discharge power at low SOC.

For example, the thickness of the negative electrode current collector may be 4.0 µm, 4.1 µm, 4.2 µm, 4.3 µm, 4.4 µm, 4.5 µm, 4.6 µm, 4.7 µm, 4.8 µm, 4.9 µm, 5.0 µm, 5.1 µm, 5.2 µm, 5.3 µm, 5.4 µm, 5.5 µm, 5.6 µm, 5.7 µm, 5.8 µm, 5.9 µm, 6 µm, or in a range defined by any two of these values.

The negative electrode film layer is usually formed by applying a negative electrode slurry onto the negative electrode current collector, followed by drying and cold-pressing. The negative electrode slurry is usually formed by dispersing the negative electrode active material, and optionally, the conductive agent, optionally, the binder, and optionally, another adjuvant in a solvent and stirring them evenly. The solvent may be but is not limited to N-methylpyrrolidone (NMP) or deionized water.

The negative electrode plate does not exclude additional functional layers other than the negative electrode film layer. For example, in some embodiments, the negative electrode plate of these embodiments of this application further includes a conductive primer layer (which is, for example, formed by a conductive agent and a binder) sandwiched between the negative electrode current collector and the negative electrode film layer and provided on the surface of the negative electrode current collector. In some other embodiments, the negative electrode plate of these embodiments of this application further includes a protection layer covering the surface of the negative electrode film layer.

In some embodiments, the electrolyte further includes an organic solvent.

In some embodiments, the organic solvent may further include a cyclic carbonate, where based on the total mass of the electrolyte, a ratio of a mass percentage of the cyclic carbonate to a mass percentage of the lithium hexafluorophosphate is (0.60 to 2.50):1, and optionally, (1.00 to 1.65):1.

The possible beneficial effects are speculated as follows: With the ratio of the mass percentage of the cyclic carbonate to the mass percentage of the lithium hexafluorophosphate fell within the foregoing range, it is conducive to fully dissociating more lithium ions from the lithium hexafluorophosphate, so that even at the end of discharge at low SOC, the electrolyte system can still contain more lithium ions, and the lithium ions can be continuously dissociated as the battery reaction proceeds, thereby improving the power performance of the battery.

For example, the ratio of the mass percentage of the cyclic carbonate to the mass percentage of the lithium hexafluorophosphate may be 0.6:1, 0.7:1, 0.8:1, 0.9:1, 1.0:1, 1.1:1, 1.15:1, 1.2:1, 1.3:1, 1.35:1, 1.37:1, 1.4:1, 1.5:1, 1.6:1, 1.65:1, 1.67:1, 1.7:1, 1.8:1, 1.9:1, 2:1, 2.1:1, 2.2:1, or in a range defined by any two of these values.

In some embodiments, the mass percentage of the cyclic carbonate in the electrolyte ranges from 10% to 45%, and further optionally, from 20% to 30%. The cyclic carbonate has a high dielectric constant and high ionic conductivity, and thus can form a stable SEI film on the surface of the negative electrode active material, which is conducive to the power performance of the battery at the end of discharge.

For example, the mass percentage of the cyclic carbonate may be 10%, 10.92%, 11%, 12%, 13%, 14%, 15%, 16%, 17%, 18%, 19%, 20%, 20.93%, 21%, 22%, 23%, 23.66%, 24%, 25%, 26%, 27%, 28%, 29%, 29.12%, 30%, 30.03%, 31%, 32%, 33%, 34%, 35%, 36%, 36.4%, 37%, 38%, 39%, 40%, 40.4%, 41%, 42%, 43%, 44%, 45%, or in a range defined by any two of these values.

In some embodiments, the cyclic carbonate may include at least one of ethylene carbonate EC, propylene carbonate PC, and butylene carbonate BC.

In some embodiments, the organic solvent may include a linear carbonate, where based on the total mass of the electrolyte, a ratio of a mass percentage of the linear carbonate to the mass percentage of the cyclic carbonate is (0.9 to 6):1, and optionally, (1.5 to 2.65):1. With the ratio of the mass percentage of the linear carbonate to the mass percentage of the cyclic carbonate satisfied the foregoing range, the viscosity and ionic conductivity of the electrolyte can be increased, and the kinetic performance of lithium ions can be improved.

For example, the ratio of the mass percentage of the linear carbonate to the mass percentage of the cyclic carbonate may be 0.9:1, 1.0:1, 1.1:1, 1.2:1, 1.3:1, 1.37:1, 1.4:1, 1.5:1, 1.6:1, 1.65:1, 1.67:1, 1.7:1, 1.8:1, 1.9:1, 2.0:1, 2.1:1, 2.2:1, 2.3:1, 2.4:1, 2.5:1, 2.6:1, 2.7:1, 2.8:1, 2.9:1, 3.0:1, 3.1:1, 3.2:1, 3.3:1, 3.4:1, 3.5:1, 3.6:1, 3.7:1, 3.8:1, 3.9:1, 4.0:1, 4.1:1, 4.2:1, 4.3:1, 4.4:1, 4.5:1, 4.6:1, 4.7:1, 4.8:1, 4.9:1, 5.0:1, 5.1:1, 5.2:1, 5.3:1, 5.4:1, 5.5:1, 5.6:1, 5.7:1, 5.8:1, 5.9:1, 5.95:1, 6:1, or in a range defined by any two of these values.

In some embodiments, the mass percentage of the linear carbonate ranges from 35% to 65%, and further optionally, from 50% to 60%. The linear carbonate has a relatively low viscosity, which helps sufficient dissolution of the lithium hexafluorophosphate of a high percentage, and facilitates the rapid migration of lithium ions dissociated from the lithium hexafluorophosphate between the positive and negative electrodes. Additionally, the combined use of the linear carbonate and the cyclic carbonate also helps to increase the electrochemical stability of the electrolyte system and effectively reduces side reactions of the electrolyte.

For example, the mass percentage of the linear carbonate may be 35%, 36%, 37%, 38%, 39%, 40%, 41%, 42%, 43%, 44%, 45%, 46%, 47%, 48%, 49%, 50%, 50.4%, 51%, 52%, 52.5%, 53%, 54%, 55%, 56%, 57%, 58%, 59%, 60%, 61%, 62%, 63%, 64%, 65%, or in a range defined by any two of these values.

In some embodiments, the linear carbonate includes at least one of ethyl methyl carbonate EMC, diethyl carbonate DEC, and dimethyl carbonate DMC.

In some embodiments, the electrolyte may further include an additive.

In some embodiments, the additive may include fluorinated cyclic carbonate.

In some embodiments, the fluorinated cyclic carbonate includes at least one of monofluoroethylene carbonate FEC, difluoroethylene carbonate DFEC, and trifluoropropylene carbonate TFPC; and optionally, the fluorinated cyclic carbonate includes monofluoroethylene carbonate FEC. The FEC contains relatively fewer fluorine atoms, and has stronger polarity, so that the fluorine is more easily deintercalated to participate in the SEI film-forming reaction.

In some embodiments, a ratio of a mass percentage of the fluorinated cyclic carbonate with respect to the total mass of the electrolyte to a mass percentage of the element silicon is (0.5 to 9.5):1, and optionally, (1 to 2):1.

For example, the ratio of the mass percentage of the fluorinated cyclic carbonate with respect to the total mass of the electrolyte to the mass percentage of the element silicon may be 0.5:1, 0.6:1, 0.7:1, 0.8:1, 0.9:1, 1:1, 1.05:1, 1.1:1, 1.2:1, 1.3:1, 1.35:1, 1.4:1, 1.5:1, 1.57:1, 1.6:1, 1.7:1, 1.8:1, 1.9:1, 2:1, 2.1:1, 2.2:1, 2.3:1, 2.36:1, 2.5:1, 3:1, 3.5:1, 4:1, 4.5:1, 4.7:1, 4.71:1, 4.8:1, 5:1, 5.5:1, 5.8:1, 6:1, 6.5:1, 7:1, 7.5:1, 7.8:1, 8:1, 8.5:1, 9:1, 9.1:1, 9.2:1, 9.3:1, 9.4:1, 9.43:1, 9.5:1, or in a range defined by any two of these values.

The fluorinated cyclic carbonate can participate in the formation of the SEI film on the surface of the negative electrode active material, improving the components and characteristics of the film, and effectively protecting the negative electrode active material, especially in the presence of silicon in the negative electrode. Due to the expansion characteristics of silicon, optimization of the components of the SEI film is more desired. The optimization of the film components is achieved by regulating the relative proportion of a film-forming additive in the electrolyte. The film formed with the participation of the fluorinated cyclic carbonate can enhance the flexibility of the SEI film, alleviate the structural collapse caused by the release of a large number of lithium ions in a short period of time at the end of discharge. Additionally, the fluorinated cyclic carbonate has a certain desolvation ability, which is beneficial for the migration of lithium ions, improving the DCR at low SOC, and enhancing discharge power. It was found through researches that when the ratio of the percentage of silicon in the negative electrode active material to the percentage of FEC in the electrolyte is (0.5 to 9.5):1, the rate performance of the battery at the end of discharge is significantly improved.

In some embodiments, a ratio of the mass percentage of the fluorinated cyclic carbonate with respect to the total mass of the electrolyte may range from 0.95% to 5.8%, and optionally, from 1.5% to 3%, for example, 0.95%, 0.98%, 1%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.82%, 3.9%, 4%, 4.1%, 4.5%, 5%, 5.2%, 5.5%, 5.7%, 5.73%, 5.8%, or in a range defined by any two of these values.

In some embodiments, the additive may further include at least one of 1,3-propane sultone PS, vinylene carbonate VC, and lithium fluosulfonate $LiSO_3F$.

In some embodiments, based on the total mass of the electrolyte, a ratio of a mass percentage of the 1,3-propane sultone PS, a mass percentage of the vinylene carbonate VC, and a mass percentage of the lithium fluosulfonate $LiSO_3F$ is (0.050 to 0.300):(0.100 to 0.500):(0.001 to 0.300). With the ratio of the mass percentage of the 1,3-propane sultone PS, the mass percentage of the vinylene carbonate VC, and the mass percentage of the lithium fluosulfonate $LiSO_3F$ fell within the foregoing range, these components can basically participate in the formation of the SEI film on the surface of the negative electrode active material, allowing the SEI film to effectively alleviate the expansion of the silicon-based material.

In some embodiments, the mass percentage of the 1,3-propane sultone PS ranges from 0.1% to 1%, for example, 0.1%, 0.2%, 0.3%, 0.4%, 0.5%, 0.6%, 0.7%, 0.8%, 0.9%, 1.0%, or in a range defined by any two of these values.

In some embodiments, the mass percentage of the vinylene carbonate VC ranges from 0.1% to 1%, for example, 0.1%, 0.2%, 0.3%, 0.4%, 0.5%, 0.6%, 0.7%, 0.8%, 0.9%, 1.0%, or in a range defined by any two of these values.

In some embodiments, the mass percentage of the lithium fluosulfonate $LiSO_3F$ ranges from 0.1% to 1%, for example, 0.1%, 0.2%, 0.3%, 0.4%, 0.5%, 0.6%, 0.7%, 0.8%, 0.9%, 1.0%, or in a range defined by any two of these values.

After the lithium salt is dissolved in the organic solvent, a large number of active lithium ions can be released to participate in charge and discharge. Some of the lithium salt can also optimize the structure of the SEI film, improve the reactivity of the electrolyte, and reduce side reactions, thereby improving the discharge power of the battery.

In some embodiments, based on the total mass of the electrolyte, the ratio of the mass percentage of the fluorinated cyclic carbonate to the mass percentage of the lithium salt is (0.05 to 0.30):1, and optionally, (0.10 to 0.20):1.

The fluorinated cyclic carbonate can form organic substances on the surface of the silicon-based material, improving the flexibility of the SEI film. The lithium salt can participate in the formation of the SEI film, and makes the SEI film contain inorganic components, which helps to improve the ionic and electronic conductivity of the SEI film, and can improve the overall ionic and electronic conductivity of the negative electrode plate. With the ratio of the mass percentage of the fluorinated cyclic carbonate to the mass percentage of the lithium salt fell within the foregoing range, the DCR can be reduced on the basis of improving the flexibility, ionic conductivity, and electronic conductivity of the SEI film, thereby enhancing the discharge power of the battery.

For example, the ratio of the mass percentage of the fluorinated cyclic carbonate to the mass percentage of the lithium salt may be 0.05:1, 0.06:1, 0.07:1, 0.08:1, 0.09:1, 0.10:1, 0.11:1, 0.12:1, 0.13:1, 0.14:1, 0.15:1, 0.16:1, 0.17:1, 0.18:1, 0.19:1, 0.20:1, 0.21:1, 0.22:1, 0.23:1, 0.24:1, 0.25:1, 0.26:1, 0.27:1, 0.28:1, 0.29:1, 0.30:1, or in a range defined by any two of these values.

In some embodiments, the lithium salt further includes at least one of fluorine-containing inorganic phosphate and fluorine-containing inorganic borate. The fluorine-containing inorganic phosphate and the fluorine-containing inorganic borate can participate in the formation of inorganic components in the SEI film, which helps to improve the ionic and electronic conductivity of the SEI film, and the formed SEI film has lower interfacial ion impedance, which is conducive to the transport of lithium ions, and can improve the DCR at low SOC.

In some embodiments, the fluorine-containing inorganic phosphate includes at least one of lithium monofluorophosphate $LiPO_2F_3$ and lithium difluorophosphate $LiPO_2F_2$; and optionally, the fluorine-containing inorganic phosphate includes lithium difluorophosphate $LiPO_2F_2$.

In some embodiments, the fluorine-containing inorganic borate includes at least one of lithium tetrafluoroborate $LiBF_4$ and lithium difluorooxalatoborate LiDFOB.

In some embodiments, based on the total mass of the electrolyte, a mass percentage of the fluorine-containing inorganic phosphate or fluorine-containing inorganic borate ranges from 0.05% to 0.50%, and optionally, from 0.10% to 0.30%.

For example, the mass percentage of the fluorine-containing inorganic phosphate or fluorine-containing inorganic borate may be 0.05%, 0.06%, 0.08%, 0.1%, 0.15%, 0.18%, 0.2%, 0.22%, 0.25%, 0.28%, 0.3%, 0.32%, 0.35%, 0.38%, 0.4%, 0.42%, 0.45%, 0.48%, 0.5%, or in a range defined by any two of these values.

For example, the lithium salt includes lithium difluorophosphate $LiPO_2F_2$, lithium tetrafluoroborate $LiBF_4$, and lithium difluorooxalatoborate LiDFOB.

Optionally, based on the total mass of the electrolyte, a mass percentage of the lithium difluorophosphate $LiPO_2F_2$ may range from 0.1% to 0.5%, for example, 0.01%, 0.02%, 0.05%, 0.08%, 0.1%, 0.15%, 0.2%, 0.25%, 0.3%, 0.35%, 0.4%, 0.45%, 0.5%, or in a range defined by any two of these values.

Optionally, based on the total mass of the electrolyte, a mass percentage of the lithium tetrafluoroborate $LiBF_4$ may range from 0.01% to 0.2%, for example, 0.01%, 0.02%, 0.05%, 0.08%, 0.1%, 0.15%, 0.2%, or in a range defined by any two of these values.

Optionally, based on the total mass of the electrolyte, a mass percentage of the lithium difluorooxalatoborate LiDFOB may range from 0.01% to 0.1%, for example, 0.01%, 0.02%, 0.05%, 0.08%, 0.1%, or in a range defined by any two of these values.

The qualitative and quantitative analysis of the substances or elements mentioned in this application can be performed using suitable equipment and methods known to those skilled in the art. For relevant testing methods, reference may be made to national and international testing standards and national and international enterprise standards. Those skilled in the art can also make adaptive changes to some testing steps or instrument parameters from the perspective of testing accuracy so as to obtain more accurate test results. One testing method may be used for qualitative or quantitative analysis, or several testing methods may be used in combination for qualitative or quantitative analysis.

In these embodiments of this application, the type and percentage of the inorganic components/lithium salt in the electrolyte have meanings known in the art and can be tested using equipment and methods known in the art. For example, qualitative or quantitative analysis can be performed on inorganic components/lithium salt in the electrolyte through ion chromatography in accordance with the standard JY/T020-1996 "General Rules for Ion Chromatography Analysis Method". In this embodiment of this application, newly prepared electrolyte can be used as a sample, or free electrolyte obtained from a fully discharged and reversely dismantled battery (discharged to the lower cutoff voltage so that the state of charge of the battery is approximately 0% SOC) can be used as a sample, and ion chromatography can be used for testing.

In these embodiments of this application, the types and percentages of the organic components in the electrolyte have meanings known in the art and can be tested using equipment and methods known in the art. For example, qualitative and quantitative analysis can be performed on organic components in the electrolyte through gas chromatography in accordance with the standard GB/T9722-2006 "Chemical Reagents-General Rules for Gas Chromatography". In these embodiments of this application, newly prepared electrolyte can be used as a sample, or free electrolyte obtained from a fully discharged and reversely dismantled battery (discharged to the lower cutoff voltage so that the state of charge of the battery is approximately 0% SOC) can be used as a sample, and ion chromatography can be used for testing.

For another example, the liquid-phase nuclear magnetic resonance (NMR) test can be used to detect components of an additive in the electrolyte. For example, to detect lithium difluorophosphate and lithium hexafluorophosphate, in a nitrogen glove box, a 7 ml glass vial is prepared, 5 ml of NMR reagent premix is added to the glass vial, and then the vial is left standing at room temperature of 20° C. to 25° C. in a nitrogen atmosphere glove box for 24 h to allow the electrolyte in the electrode plate and separator to diffuse into the NMR premix, so as to obtain the NMR test sample. The NMR premix includes 100 ml of deuterated acetonitrile added with 3 ml of trifluorotoluene $C_7H_5F_3$. The NMR reagent premix is pre-dried with 4A molecular sieves (100 ml of NMR reagent premix is mixed with 15 g of freshly opened 4A molecular sieves and dried for more than 30 days at a room temperature of 20° C. to 25° C. in a nitrogen glove box). The measurement is performed using 19F NMR measurement (nuclear magnetic resonance (NMR): Bruker Avance 400HD).

The following settings are used for identifying and quantifying each substance in terms of flip angles and scan times:
fluorine spectrum test pulse sequence: 2gfhigqn.2;
delay time: 1 second; and
number of scans: 16.

The relative percentage of the trifluorotoluene and $LiPF_6$ in the F-NMR can be calculated based on the integral intensity of the signal peaks of the two substances in the following method:
relative percentage of $PF_6^- = (I_{PF6}^- \times M_{PF6}^-/6)/(I_{CF3ph} \lambda M_{CF3ph}/3)$, where I is the respective nuclear magnetic resonance peak area, and M is the respective relative molecular mass. The percentage of the lithium hexafluorophosphate in the electrolyte is then calculated based on a molar ratio of hexafluorophosphate to lithium ions.

The relative percentage of the trifluorotoluene and $PO_2F_2^-$ in the F-NMR can be calculated based on the integral intensity of the signal peaks of the two substances in the following method:
relative percentage of $PO_2F_2^- = (I_{PO2F2}^- \times M_{PO2F2}^-/2)/(I_{CF3ph} \times M_{CF3ph}/3)$, where I is the respective nuclear magnetic resonance peak area, and M is the respective relative molecular mass. The percentage of the lithium difluorophosphate in the electrolyte is then calculated based on a molar ratio of the difluorophosphate to lithium ions.

In some embodiments, the various solutes or solvents in the electrolyte mentioned in this application include substances actively added during the preparation of the electrolyte and also include substances derived from certain substances already existing in the electrolyte during the preparation of the electrolyte or in the process of preparing a battery from the electrolyte or during the storage or use of a battery containing the electrolyte.

In some embodiments, the battery cell has an electrolyte retention coefficient of 1.0 g/Ah to 2.5 g/Ah, and optionally from 1.8 g/Ah to 2.2 g/Ah.

The electrolyte retention coefficient of the battery cell can reflect the electrolyte retention capacity. With the electrolyte retention coefficient of the battery cell fell within the foregoing range, the electrolyte can provide good wetting for the positive electrode plate and the negative electrode plate. Additionally, there is a certain gap between the negative electrode plate and the separator, which can provide expansion space for the volume expansion of the silicon-based material, and reduce the risk of swelling of the overall battery.

For example, the electrolyte retention coefficient of the battery may be 1.0 g/Ah, 1.1 g/Ah, 1.2 g/Ah, 1.3 g/Ah, 1.4 g/Ah, 1.5 g/Ah, 1.6 g/Ah, 1.7 g/Ah, 1.8 g/Ah, 1.9 g/Ah, 2.0 g/Ah, 2.1 g/Ah, 2.2 g/Ah, 2.3 g/Ah, 2.4 g/Ah, 2.5 g/Ah, or in a range defined by any two of these values.

In these embodiments of this application, the electrolyte retention coefficient of the battery cell has a meaning known in the art and can be tested using equipment and methods known in the art. For example, in accordance with GB/T 31486-2015 "Electrical Performance Requirements and Test Methods for Traction Batteries for Electric Vehicles", at 25° C., the lithium-ion battery is charged to 4.35 V at 1 C, and then discharges to 2.8 V at 1 C to obtain a discharged capacity C, which is recorded as the denominator. The lithium-ion battery is weighed as M0, and then disassembled to obtain the positive electrode plate, negative electrode plate, separator, and electrolyte, where the free electrolyte is stored in the shell/bag. All the solid components of the disassembled battery (including but not limited to the positive electrode plate, negative electrode plate, separator, and other mechanical parts contributing to M0, from the disassembled battery cell) are placed in a 60° C. oven for more than 4 hours. All the components of the battery cell are weighed again as M1, where a weight difference between M0 and M1 is used as the numerator. The electrolyte retention coefficient is calculated as the capacity C divided by the weight difference between M0 and M1.

In some embodiments, the battery cell may further include a separator, where the separator has a porosity of 30% to 40%.

In the battery cell of this application, due to the relatively high percentage of the lithium hexafluorophosphate, the overall electrolyte has a relatively high viscosity, and the separator has a relatively high porosity, which facilitates the electrolyte with high viscosity to pass through the separator, so that lithium ions can migrate smoothly.

For example, the porosity of the separator may be 30%, 31%, 32%, 33%, 34%, 35%, 36%, 37%, 38%, 39%, 40%, 41%, 42%, 43%, 44%, 45%, or in a range defined by any two of these values.

In these embodiments of this application, the porosity refers to the percentage of the volume of pores within the separator to the total volume of the separator. The porosity can be tested in accordance with the standard GB/T 36363-2018 "Polyolefin Separators for Lithium-ion Batteries".

In some embodiments, the separator includes an organic substrate and a coating provided on at least one side of the organic substrate, where the coating includes a heat-resistant layer and an organic layer, the heat-resistant layer is provided on a surface of the organic substrate, and the organic layer is provided on a surface of the heat-resistant layer facing away from the organic substrate.

Optionally, the heat-resistant layer includes inorganic particles.

Optionally, the organic layer includes either a non-fluorinated polymer or a fluorinated polymer. Optionally, the organic layer includes a non-fluorinated polymer, for example, the non-fluorinated polymer includes polyacrylate. In this case, the organic layer is a polyacrylate layer.

For example, the coating can include a ceramic layer and/or a polyacrylate layer. The coating may include only a ceramic layer, or may include only a polyacrylate layer, or may include both a ceramic layer and a polyacrylate layer.

Optionally, under the condition that the coating includes both a ceramic layer and a polyacrylate layer, the polyacrylate layer may be provided on at least one surface of the organic substrate, and the ceramic layer is provided on the surface of the polyacrylate layer facing away from the organic substrate; or the ceramic layer may be provided on at least one surface of the organic substrate, and the polyacrylate layer is provided on the surface of the ceramic layer facing away from the organic substrate.

In the separator, the polyacrylate layer is provided on the outer surface of the separator, so that the outer surface of the separator has a certain flexibility, which can effectively alleviate the volume expansion or contraction of the silicon-based material and enhance the overall structural stability of the electrode assembly.

The organic substrate is not particularly limited to a particular material and can be any known base film with good chemical and mechanical stability. For example, the organic substrate may include at least one of a porous polyolefin resin film (for example, at least one of polyethylene, polypropylene, polytetrafluoroethylene, polyvinyl fluoride, and polyvinylidene fluoride), porous glass fiber, and porous non-woven fabric. The organic substrate can be selected from a single-layer film or a multilayer composite film. When the organic substrate is a multilayer composite film, each layer can be made of the same material or different materials.

In some embodiments, the organic substrate has a thickness of 6.6 μm to 7.6 μm.

With the thickness of the organic substrate fell within the foregoing range, the transport rate of lithium ions in the negative electrode plate and the transport rate of lithium ions in the separator are basically the same, reducing the risk of deteriorating salinity gradient polarization, and improving discharge performance.

For example, the thickness of the organic substrate may be 6.6 μm, 6.7 μm, 6.8 μm, 6.9 μm, 7.0 μm, 7.1 μm, 7.2 μm, 7.3 μm, 7.4 μm, 7.5 μm, 7.6 μm, or in a range defined by any two of these values.

In some embodiments, the polyacrylate in the polyacrylate layer may be produced by polymerizing a polymer monomer. The polymer monomer includes at least one of a first polymer monomer, a second polymer monomer, and a third polymer monomer. Optionally, the polymer monomer includes a first polymer monomer, a second polymer monomer, and a third polymer monomer. The polyacrylate produced by polymerizing the foregoing three polymer monomers can give the separator suitable adhesion to the electrode plate, improving the kinetic performance of the battery.

The first polymer monomer has at least one ester bond, optionally, is one or more of methyl acrylate, ethyl acrylate, n-propyl acrylate, n-butyl acrylate, isobutyl acrylate, sec-butyl acrylate, tert-butyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, 2-hydroxypropyl methacrylate, vinyl acetate, trifluoroethyl methacrylate, glycidyl methacrylate, or trimethylolpropane triacrylate, and more optionally, is one or more of methyl methacrylate, lauryl acrylate, lauryl methacrylate, or trimethylolpropane triacrylate.

The second polymer monomer has at least one cyano group, optionally, is one or more of acrylonitrile, methacrylonitrile, or ethyl acrylonitrile, and more optionally, is one or more of acrylonitrile or methacrylonitrile.

The third polymer monomer has at least one amide bond, optionally, is one or more of acrylamide, N-hydroxymethyl acrylamide, or N-butoxymethyl acrylamide, and more optionally, is one or more of acrylamide or N-hydroxymethyl acrylamide.

In some embodiments, a weight ratio of the first polymer monomer, the second polymer monomer, and the third polymer monomer that produce the polyacrylate is (45 to 70):(10 to 25):(10 to 35), for example, (50 to 70):(10 to 25):(10 to 35), (55 to 70):(10 to 25):(10 to 35), (60 to 70):(10 to 25):(10 to 35), (65 to 70):(10 to 25):(10 to 35), (45 to 70):(15 to 25):(10 to 35), (45 to 70):(20 to 25):(10 to 35), (45 to 70):(22 to 25):(10 to 35), (45 to 70):(10 to 25):(15 to 35), (45 to 70):(10 to 25):(20 to 35), (45 to 70):(10 to 25):(25 to 35), (45 to 70):(10 to 25):(30 to 35), (45 to 70):(10 to 25):(32 to 35), or the like.

In some embodiments, the ceramic layer includes inorganic particles with heat resistance. The inorganic particles may include at least one of inorganic particles with a dielectric constant of 5 or higher, inorganic particles with an ability to transport active ions, and inorganic particles capable of electrochemical oxidation and reduction.

In some embodiments, the inorganic particles with a dielectric constant of 5 or higher may include at least one of boehmite (γ-AlOOH), aluminum oxide ($Al_2O_3$), barium sulfate ($BaSO_4$), magnesium oxide (MgO), magnesium hydroxide ($Mg(OH)_2$), silicon-oxygen compound $SiO_x$ (0<x≤2), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), hafnium dioxide ($HfO_2$), cerium oxide ($CeO_2$), zirconium titanate ($ZrTiO_3$), barium titanate ($BaTiO_3$), magnesium fluoride ($MgF_2$), $Pb(Zr,Ti)O_3$ (PZT for short), $Pb_{1-m}La_mZr_{1-n}Ti_nO_3$ (PLZT for short, 0<m<1, 0<n<1), and $Pb(Mg_{3}Nb_{2/3})O_3$—$PbTiO_3$ (PMN-PT for short).

In some embodiments, the inorganic particles with the ability to transport active ions may include at least one of lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), (LiAl-TiP)$_xO_y$, type glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$ type glass ($Li_xSi_yS_z$, 0<x<3, 0<y<2, 0<z<4), and $P_2S_5$ type glass ($Li_xP_yS_z$, 0<x<3, 0<y<3, 0<z<7).

In some embodiments, the inorganic particles capable of electrochemical oxidation and reduction may include at least one of lithium-containing transition metal oxide, lithium-containing phosphate with olivine structure, a carbon-based material, a silicon-based material, a tin-based material, and a lithium-titanium compound.

In some embodiments, the ceramic layer may further include a binder. Optionally, the binder includes one or more of polyacrylate, acrylic acid, carboxymethyl cellulose, polyvinylidene fluoride-co-trichloroethylene copolymer, polymethyl methacrylate, polyvinylpyrrolidone, polyvinyl acetate, polyvinyl acetate copolymer, polyethylene oxide, polyarylate, cellulose acetate, cellulose acetate butyrate, cellulose acetate propionate, polyvinylidene fluoride, polyacrylonitrile, polyvinyl alcohol, starch, hydroxypropyl cellulose, regenerated cellulose, tetrafluoroethylene, polyethylene, polypropylene, and cyanoethyl branched starch.

In some embodiments, the coating has a thickness of 1.5 μm to 2.5 μm.

The thickness of the coating is a thickness of the single-sided coating, specifically including a total thickness of the ceramic layer and the polyacrylate layer. For example, if the organic substrate has a coating on two sides, the thickness of the coating on one side of the organic substrate is the thickness of the single-sided coating. If the organic substrate has a coating on only one side, the thickness of the coating on that side is the thickness of the single-sided coating. With the thickness of the coating fell within the foregoing range, the transport rate of lithium ions in the negative electrode plate and the transport rate of lithium ions in the separator are basically the same, reducing the risk of deteriorating salinity gradient polarization, and improving discharge performance.

For example, the thickness of the coating may be 1.5 μm, 1.6 μm, 1.7 μm, 1.8 μm, 1.9 μm, 2.0 μm, 2.1 μm, 2.2 μm, 2.3 μm, 2.4 μm, 2.5 μm, or in a range defined by any two of these values.

In some embodiments, the ratio of the thickness of the ceramic layer to the thickness of the polyacrylate layer may be (0.5 to 2.0):1, for example, 0.5:1, 0.7:1, 0.8:1, 0.9:1, 1.0:1, 1.1:1, 1.2:1, 1.3:1, 1.4:1, 1.5:1, 1.6:1, 1.7:1, 1.8:1, 1.9:1, 2.0:1, or in a range defined by any two of these values.

In the embodiments of this application, the meanings of the thickness of the organic substrate and the coating are known in the art and can be tested using equipment and methods known in the art. For example, the thickness can be measured using an ion beam cross-section polisher and a scanning electron microscope. In an example, the test can be performed according to the following steps: cutting the separator into to-be-tested samples of a specific size (for example, 6 mm×6 mm), clamping the to-be-tested sample between two electrically and thermally conductive sheets (for example, copper foils), fixing the to-be-tested sample and sheets with glue (for example, double-sided tape), pressing the to-be-tested sample and sheets with a flat iron block of specific mass (for example, approximately 400 g) for a specific period of time (for example, 1 hour) to minimize the gap between the to-be-tested sample and the copper foils as much as possible, trimming the edges with scissors, attaching the to-be-tested sample to the sample stage using conductive glue, ensuring the sample slightly protrudes from the edge of the sample stage, loading the sample stage into a sample holder, and locking the sample stage in place, powering on an argon ion beam cross-section polisher and evacuating the polisher (for example, to 10 Pa-4 Pa), setting the argon flow (for example, to 0.15 MPa), voltage (for example, to 8 KV), and polishing time (for example, to 2 hours), adjusting the sample stage to rocking mode to start polishing, and after polishing, using a scanning electron microscope (for example, ZEISS Sigma 300) to obtain the ion beam cross-section polisher (CP) image of the to-be-tested sample to measure the thickness of the coating and the organic substrate.

In some embodiments, the battery cell further includes a positive electrode plate.

In some embodiments, the positive electrode plate includes a positive electrode current collector and a positive electrode film layer provided on at least one surface of the positive electrode current collector and containing a positive electrode active material. For example, the positive electrode current collector has two opposite surfaces in its thickness direction, and the positive electrode film layer is provided on either or both of the two opposite surfaces of the positive electrode current collector.

The positive electrode film layer includes a positive electrode active material, and the positive electrode active material may be a well-known positive electrode active material used for batteries in the art. In an example, the positive electrode active material may include at least one of the following materials: a layered structure positive electrode active material (for example, lithium nickel cobalt manganese oxide, lithium/sodium nickel oxide, lithium cobalt oxide/sodium, lithium/sodium manganese oxide, lithium/sodium rich layered and rock salt phase layered materials), an olivine-type phosphate active material, and a spinel structure positive electrode active material (for example, spinel lithium manganese oxide, spinel lithium nickel manganese oxide, lithium-rich spinel lithium manganese oxide, and lithium nickel manganese oxide).

In some embodiments, the positive electrode active material includes a compound with a molecular formula of $Li_dNi_aCO_bMn_cM_{(1-a-b-c)}Y_z$, where 0<d≤2.1, 0.6<a<1, 0<b<1, 0<c<1, and 0.6<a+b+c<1, 1.8≤z≤3.5, and element M includes at least one of B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; and element Y includes at least one of O and F.

In addition to including element lithium, the positive electrode active material further includes element nickel, element cobalt, element manganese, and element M. the element nickel can increase the gram capacity of the positive electrode active material, the element cobalt can stabilize the crystal structure of the positive electrode active material, the element manganese can enhance the overall structural stability of the positive electrode active material, and the element M can improve the crystal structure stability of the positive electrode active material.

In some embodiments, d may be 0.01, 0.02, 0.05, 0.08, 0.10, 0.12, 0.15, 0.18, 0.20, 0.22, 0.25, 0.28, 0.30, 0.32, 0.35, 0.38, 0.40, 0.42, 0.45, 0.48, 0.50, 0.52, 0.55, 0.58, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1, 1.1, 1.2, 1.3, 1.4, 1.5, 1.6, 1.7, 1.8, 1.9, 2.0, 2.1, or in a range defined by any two of these values.

In some embodiments, a may be 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or in a range defined by any two of these values.

In some embodiments, b may be 0.01, 0.02, 0.05, 0.08, 0.10, 0.12, 0.15, 0.18, 0.20, 0.22, 0.25, 0.28, 0.30, 0.32, 0.35, 0.38, 0.40, 0.42, 0.45, 0.48, 0.50, 0.52, 0.55, 0.58, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or in a range defined by any two of these values.

In some embodiments, c may be 0.01, 0.02, 0.05, 0.08, 0.10, 0.12, 0.15, 0.18, 0.20, 0.22, 0.25, 0.28, 0.30, 0.32, 0.35, 0.38, 0.40, 0.42, 0.45, 0.48, 0.50, 0.52, 0.55, 0.58, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or in a range defined by any two of these values.

In some embodiments, a+b+c may be 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or in a range defined by any two of these values.

In some embodiments, z may be 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, or in a range defined by any two of these values.

During the charge and discharge processes of the battery, active ions such as Li are deintercalated and consumed, resulting in different molar contents of Li at different states of discharge of the battery. In the example of the positive electrode active material of these embodiments of this application, the molar content of lithium is in the initial state of the material, that is, before the material is used in the battery. When the positive electrode active material is applied to the battery system and after undergoing charge and discharge cycles, the molar content of lithium in the positive electrode active material may change.

In the examples of the positive electrode active material of these embodiments of this application, the molar content of oxygen O is only a theoretical value. The release of oxygen from the lattice causes the molar content of oxygen O to change. In practice, the molar content of oxygen O may fluctuate.

In some embodiments, the element M includes at least one of titanium Ti and zirconium Zr; and optionally, M includes both element Ti and element Zr. Both Ti and Zr can enhance cycling performance.

In some embodiments, based on the total mass of the positive electrode active material, the total mass percentage of elements Ti and Zr ranges from 1600 ppm to 3150 ppm. The addition amount of Ti and Zr being within the foregoing range can further enhance the crystal structure of the positive electrode active material and improve cycling performance.

The total mass percentage of elements Ti and Zr refers to a ratio of the total mass of the elements Ti and Zr to the total mass of the positive electrode active material.

For example, the total mass percentage of elements Ti and Zr may be 1600 ppm, 1700 ppm, 1800 ppm, 1900 ppm, 2000 ppm, 2100 ppm, 2200 ppm, 2300 ppm, 2400 ppm, 2500 ppm, 2600 ppm, 2700 ppm, 2800 ppm, 2900 ppm, 3000 ppm, 3100 ppm, 3150 ppm, or in a range defined by any two of these values.

In some embodiments, based on the total mass of the positive electrode active material, the mass percentage of element Ti ranges from 100 ppm to 600 ppm, for example, 100 ppm, 200 ppm, 300 ppm, 400 ppm, 450 ppm, 500 ppm, 600 ppm, or in a range defined by any two of these values.

In some embodiments, based on the total mass of the positive electrode active material, the mass percentage of element Zr ranges from 500 ppm to 2550 ppm, and optionally from 1500 ppm to 2550 ppm, for example, 500 ppm, 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, 2100 ppm, 2200 ppm, 2300 ppm, 2400 ppm, 2500 ppm, 2550 ppm, or in a range defined by any two of these values.

In some embodiments, at least one of the lithium difluorooxalatoborate LiDFOB and lithium tetrafluoroborate $LiBF_4$ in the electrolyte can provide fluorine ions and boron ions. In the later stage of battery cycling, metal ions such as Ti and Zr ions in the positive electrode active material have the risk of dissolving into the electrolyte and migrating to the surface of the negative electrode plate. Fluorine ions and boron ions can have a strong binding ability with these metal ions, which reduces the risk of metal ions migrating to the surface of the negative electrode plate, improves cycling performance of the battery, and can also compensate for power degradation caused by Ti and Zr ions.

In some embodiments, the positive electrode active material includes monocrystalline particles, where the monocrystalline particles include an inner region and an outer region. The outer region is a region extending 500 nm inward from any point on the outer surface of the monocrystalline particle. The element M includes element aluminum Al, where the element aluminum Al is at least distributed in the outer region.

The inner region of the monocrystalline particles can be understood as the core of the monocrystalline particles, with the outer region surrounding the inner region. There may be no clear boundary between the outer and inner regions. The outer and inner regions can be considered as two artificially defined regions, where the outer region is a region extending 500 nm from any point on the outer surface of the monocrystalline particles to the interior of the monocrystalline particles, where the extension path is a linear path. The outer region can be understood as an annular structure, where a radial distance of the annular structure is less than or equal to 500 nm.

The distribution of element aluminum Al in the outer region helps produce aluminum oxide $Al_2O_3$ on the surface of the positive electrode active material, can passivate side reactions between the positive electrode active material and the electrolyte, further enhance the structural stability of the positive electrode active material, and improve cycling performance of the battery. Certainly, in addition to being distributed in the outer region, the element Al can be further distributed in the inner region.

In some embodiments, based on the total mass of the positive electrode active material, the mass percentage of element Al ranges from 500 ppm to 3000 ppm, and optionally from 1000 ppm to 2000 ppm.

For example, the mass percentage of the element Al may be 500 ppm, 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, or in a range defined by any two of these values.

In some embodiments, the combination of the lithium difluorophosphate $LiPO_2F_2$ in the electrolyte with the element Al in the positive electrode active material can improve the DCR of the surface of the positive electrode active material and enhance interfacial power.

In some embodiments, the element M includes at least one of element phosphorus P, element sulfur S, and element boron B; and optionally, the element M includes element phosphorus P, element sulfur S, and element boron B. The element phosphorus P, element sulfur S, and element boron B can enhance the structural stability of the positive electrode active material and improve cycling performance of the battery.

In some embodiments, based on the total mass of the positive electrode active material, the total mass percentage of elements P, S, and B ranges from 0 to 800 ppm, and optionally from 10 ppm to 500 ppm, for example, 0, 10 ppm, 20 ppm, 30 ppm, 40 ppm, 50 ppm, 60 ppm, 80 ppm, 100 ppm, 150 ppm, 200 ppm, 250 ppm, 300 ppm, 350 ppm, 400 ppm, 450 ppm, 500 ppm, 600 ppm, 700 ppm, 800 ppm, or in a range defined by any two of these values. The total mass percentage of elements P, S, and B being 0 indicates that no such elements are added.

In some embodiments, based on the total mass of the positive electrode active material, the total mass percentage of element P ranges from 10 ppm to 500 ppm. For example, 10 ppm, 20 ppm, 30 ppm, 40 ppm, 50 ppm, 60 ppm, 80 ppm, 100 ppm, 150 ppm, 200 ppm, 250 ppm, 300 ppm, 350 ppm, 400 ppm, 450 ppm, 500 ppm, or in a range defined by any two of these values.

In some embodiments, based on the total mass of the positive electrode active material, the total mass percentage of element S ranges from 10 ppm to 500 ppm. For example, 10 ppm, 20 ppm, 30 ppm, 40 ppm, 50 ppm, 60 ppm, 80 ppm, 100 ppm, 150 ppm, 200 ppm, 250 ppm, 300 ppm, 350 ppm, 400 ppm, 450 ppm, 500 ppm, or in a range defined by any two of these values.

In some embodiments, based on the total mass of the positive electrode active material, the total mass percentage of element B ranges from 10 ppm to 500 ppm. For example, 10 ppm, 20 ppm, 30 ppm, 40 ppm, 50 ppm, 60 ppm, 80 ppm, 100 ppm, 150 ppm, 200 ppm, 250 ppm, 300 ppm, 350 ppm, 400 ppm, 450 ppm, 500 ppm, or in a range defined by any two of these values.

In some embodiments, the additive of the electrolyte may include lithium fluosulfonate, which can form low-impedance film components on the surface of the positive electrode active material. The combined use of the lithium fluosulfonate and the element phosphorus P, element sulfur S, and element boron B in the positive electrode active material can reduce the DCR of the surface of the positive electrode active material and enhance interfacial power.

In these embodiments of this application, the percentages of elements in the positive electrode active material have meanings well known in the art and can be tested using equipment and methods known in the art. For example, in accordance with EPA 6010D-2014, the inductively coupled plasma optical emission spectrometry is used for testing, and a plasma atomic emission instrument (ICP-OES, instrument model: Thermo ICAP7400) is used for determination. First, 0.4 g of the positive electrode active material is weighed, 10 ml (concentration of 50%) aqua regia is added therein, and then the mixture is placed on a 180° C. flat plate for 30 min. After the mixture is digested on the flat plate, its volume is fixed to 100 ml, and quantitative testing is performed using the standard curve method.

In some embodiments, the positive electrode film layer further optionally includes a positive electrode conductive agent. The positive electrode conductive agent is not limited to a particular type in these embodiments of this application. For example, the positive electrode conductive agent includes at least one of superconducting carbon, conductive graphite, acetylene black, carbon black, Ketjen black, carbon dots, carbon nanotubes, graphene, and carbon nanofiber. In some embodiments, based on the total mass of the positive electrode film layer, the mass percentage of the positive electrode conductive agent is ≤5%.

In some embodiments, the positive electrode film layer further optionally includes a positive electrode binder. The positive electrode binder is not limited to a particular type in these embodiments of this application. For example, the positive electrode binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin. In some embodiments, based on the total mass of the positive electrode film layer, the mass percentage of the positive electrode binder is ≤5%.

In some embodiments, the ratio of the pellet density of the positive electrode film layer to the pellet density of the negative electrode film layer is (2 to 2.5):1, for example, 2:1, 2.1:1, 2.2:1, 2.3:1, 2.4:1, 2.5:1, or in a range defined by any two of these values.

In some embodiments, the positive electrode film layer has a pellet density PD of 3 $g/cm^3$ to 3.5 $g/cm^3$, for example, 3 $g/cm^3$, 3.1 $g/cm^3$, 3.2 $g/cm^3$, 3.3 $g/cm^3$, 3.4 $g/cm^3$, 3.5 $g/cm^3$, or in a range defined by any two of these values.

In these embodiments of this application, the pellet density of the positive electrode active material has a meaning known in the art and can be tested by using a method known in the art. For example, take a single-side coated and cold-pressed positive electrode plate (if a double-side coated positive electrode plate is used, a positive electrode film layer on one side may be wiped off first), punch it into a small disc with an area of S1, weigh it, and record the weight as M1. Then wipe off a positive electrode film layer of the weighed positive electrode plate, weigh a positive electrode current collector, and record the weight as M0. The surface density of the positive electrode film layeractive material layer=(the weight M1 of the positive electrode plate–the weight M0 of the positive electrode current collector)/S1, and the pellet density of the positive electrode active material layer=the surface density of the positive electrode active material layer/the thickness of the positive electrode active material layer.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. In an example, the metal material of the metal layer may include at least one of aluminum, aluminum alloy, nickel, nickel alloy, titanium, titanium alloy, silver, and silver alloy. For example, the polymer material matrix may include at least one of polypropylene (PP), polyethylene terephthalate (PET), polybutylene terephthalate (PBT), polystyrene (PS), and polyethylene (PE).

For example, the thickness of the positive electrode current collector is less than or equal to 10 μm, and optionally from 8 μm to 10 μm.

The relatively thin thickness of the positive electrode current collector can weaken the heat dissipation channel of the battery. In a low SOC discharge state, the battery cell can retain some heat, which is conducive to improving the DCR at low SOC, thereby enhancing discharge power at low SOC.

For example, the thickness of the positive electrode current collector may be 8 μm, 8.2 μm, 8.5 μm, 8.8 μm, 9.0 μm, 9.2 μm, 9.5 μm, 9.6 μm, 9.8 μm, 10 μm, or in a range defined by any two of these values.

In these embodiments of this application, the thickness of the positive electrode current collector has a meaning known in the art and can be tested using equipment and methods known in the art. For example, the positive electrode plate can be used as a sample, then the positive electrode film layer on the surface of the positive electrode plate can be washed off with an organic solvent such as alcohol, and the thickness of the positive electrode current collector can be measured with a micrometer.

The positive electrode film layer is typically formed by applying a positive electrode slurry onto the positive electrode current collector, followed by drying and cold pressing. The positive electrode slurry is typically formed by dispersing the positive electrode active material, the optional conductive agent, the optional binder, and any other components in a solvent and stirring them to uniformity. The solvent may be N-methylpyrrolidone (NMP), but is not limited thereto.

In some embodiments, the positive electrode plate, separator, and negative electrode plate can be made into an electrode assembly through winding process and/or lamination process. It can be understood that the electrode assembly can be a wound electrode assembly or a laminated electrode assembly. Optionally, the electrode assembly is a laminated electrode assembly, where the laminated electrode assembly enables the positive and negative electrode plates to be more closely packed, which can further improve the DCR.

In some embodiments, the battery may include an outer package. The outer package may be used for packaging the electrode assembly and the electrolyte.

In some embodiments, the outer package of the battery may be a hard shell, for example, a hard plastic shell, an aluminum shell, or a steel shell. Alternatively, the outer package of the battery may be a soft pack, for example, a soft pouch. The material of the soft pack may be plastic, for example, at least one of polypropylene (PP), polybutylene terephthalate (PBT), or polybutylene succinate (PBS).

The battery is not particularly limited to a particular material in these embodiments of this application and may be cylindrical, rectangular, or of any other shapes. FIG. 1 shows a rectangular battery cell 5 as an example.

Figure 2:
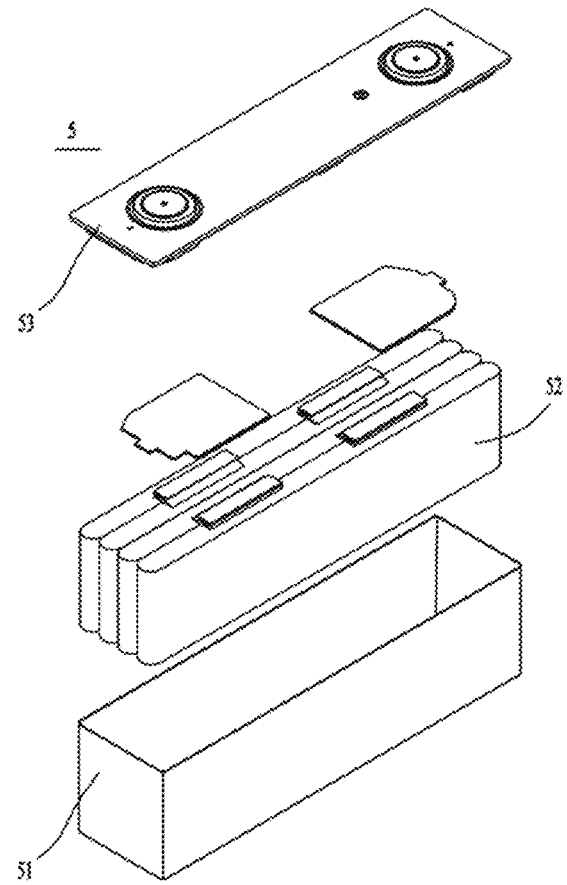
FIG. 2 is a schematic exploded view of the embodiment of the battery cell shown in FIG. 1.

In some embodiments, as shown in FIG. 2, the outer package may include a housing 51 and a cover plate 53. The housing 51 may include a bottom plate and a side plate connected to the bottom plate, and the bottom plate and the side plate are enclosed to form an accommodating cavity. The housing 51 has an opening communicating with the accommodating cavity, and the cover plate 53 is configured to cover the opening to close the accommodating cavity. The positive electrode plate, the negative electrode plate, and the separator may be made into an electrode assembly 52 through winding process and/or lamination process. The electrode assembly 52 is packaged in the accommodating cavity. The electrolyte infiltrates the electrode assembly 52. There may be one or more electrode assemblies 52 in the battery cell 5, and the quantity may be adjusted as required.

The preparation method of the battery of the embodiments of this application is well known. In some embodiments, the positive electrode plate, the separator, the negative electrode plate, and the electrolyte may be assembled to form a battery. For example, the positive electrode plate, the separator, and the negative electrode plate may be made into an electrode assembly through winding process and/or lamination process, and the electrode assembly is placed in an outer package which is filled with electrolyte after drying, followed by processes such as vacuum packaging, standing, formation, and shaping, to obtain a battery.

In some embodiments of the embodiments of this application, such batteries of the embodiments of this application may be assembled into a battery module. The battery module may include a plurality of batteries whose quantity may be adjusted based on application and capacity of the battery module.

Figure 3:
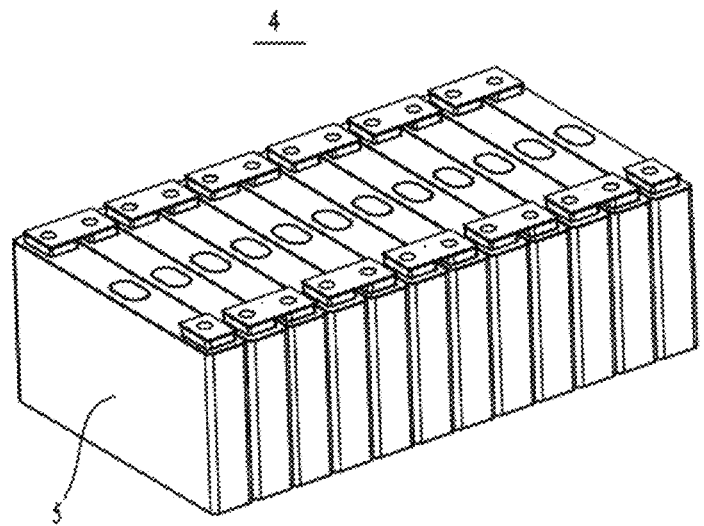
FIG. 3 is a schematic diagram of an embodiment of a battery module in this application.

FIG. 3 is a schematic diagram of a battery module 4 as an example. As shown in FIG. 3, in the battery module 4, a plurality of battery cells 5 may be sequentially arranged along the length direction of the battery module 4. Certainly, the batteries may alternatively be arranged in any other manners. Further, the plurality of battery cells 5 may be fastened by using fasteners.

Optionally, the battery module 4 may further include a shell with an accommodating space, and the plurality of battery cells 5 are accommodated in the accommodating space.

In some embodiments, the battery module may be further assembled into a battery pack, and the quantity of battery modules included in the battery pack may be adjusted based on application and capacity of the battery pack.

Figure 4:
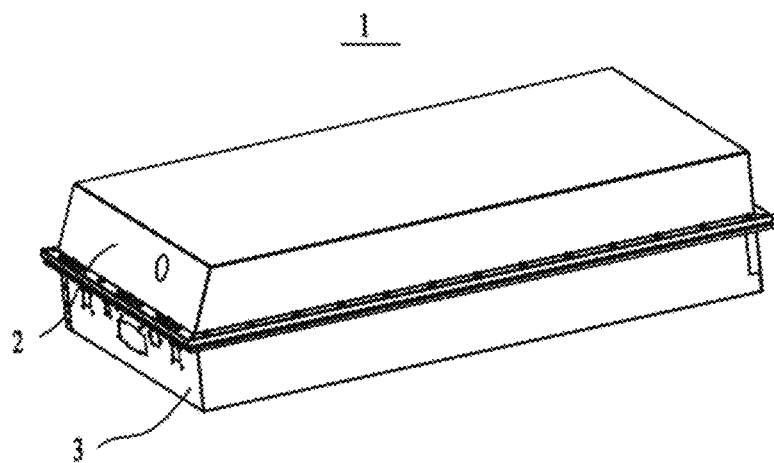
FIG. 4 is a schematic diagram of an embodiment of a battery pack in this application.
Figure 5:
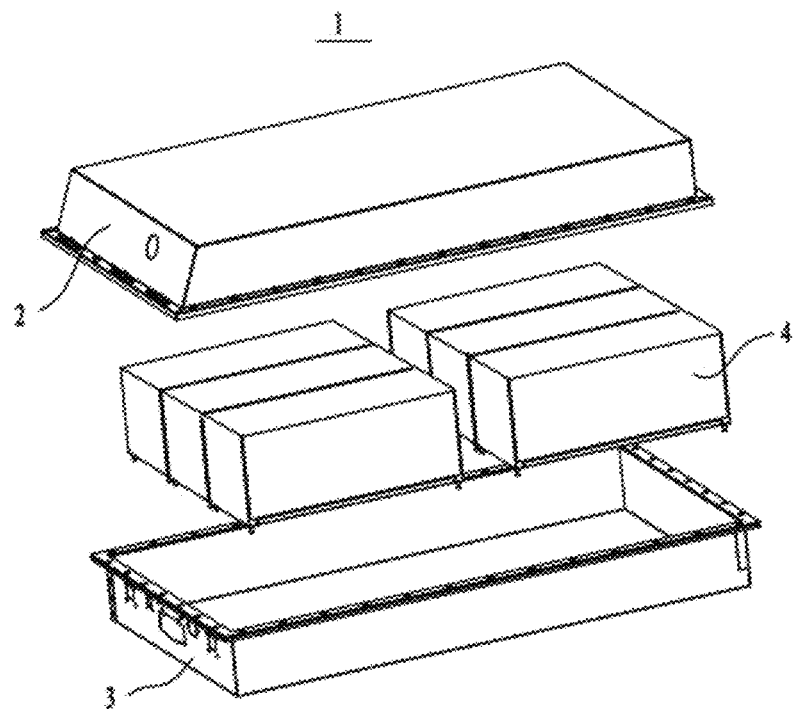
FIG. 5 is a schematic exploded view of the embodiment of the battery pack shown in FIG. 4.

FIG. 4 and FIG. 5 are schematic diagrams of a battery pack 1 as an example. As shown in FIG. 4 and FIG. 5, the battery pack 1 may include a battery box and a plurality of battery modules 4 arranged in the battery box. The battery box includes an upper box body 2 and a lower box body 3. The upper box body 2 is configured to be engaged with the lower box body 3 to form an enclosed space for accommodating the battery modules 4. The plurality of battery modules 4 may be arranged in the battery box in any manner.

Electric Apparatus

A second aspect of the embodiments of this application provides an electric apparatus, where the electric apparatus includes at least one of the battery, the battery module, or the battery pack provided in the embodiments of this application. The battery, the battery module, or the battery pack may be used as a power source for the electric apparatus or an energy storage unit of the electric apparatus. The electric apparatus may be, but is not limited to, a mobile device (for example, a mobile phone or a laptop computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, or an energy storage system.

The battery, the battery module, or the battery pack may be selected for the electric apparatus based on requirements for using the electric apparatus.

Figure 6:
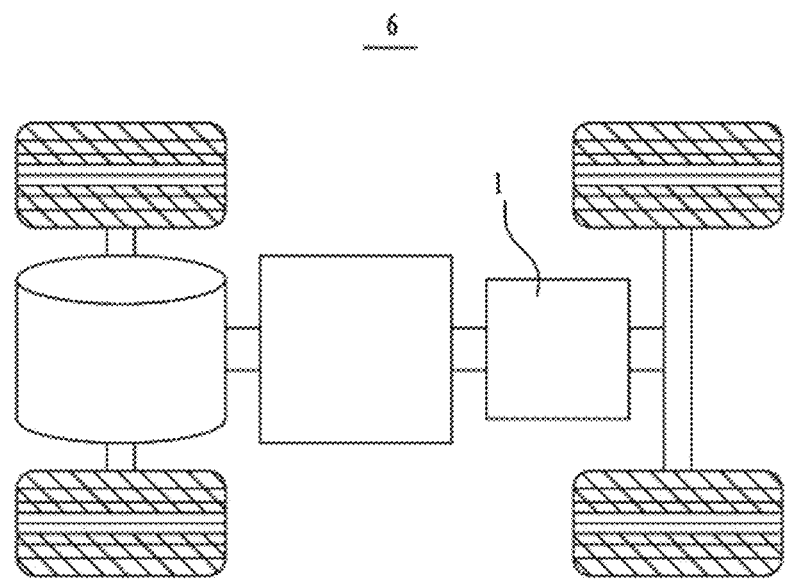
FIG. 6 is a schematic diagram of an embodiment of an electric apparatus including the battery cell in this application as a power source.

FIG. 6 is a schematic diagram of an electric apparatus 6 as an example. This electric apparatus 6 is a battery electric vehicle, a hybrid electric vehicle, a plug-in hybrid electric vehicle, or the like. To satisfy the requirements of the electric apparatus 6 for high power and high energy density, a battery pack or a battery module may be used.

In another example, the electric apparatus may be a mobile phone, a tablet computer, a notebook computer, or the like. Such electric apparatus is generally required to be light and thin and may use a battery as its power source.

EXAMPLES

Content disclosed in the embodiments of this application is described in detail in the following examples. These examples are intended only for illustrative purposes because various modifications and changes made without departing from the scope of the content disclosed in the embodiments of this application are apparent to those skilled in the art. Unless otherwise stated, all parts, percentages, and ratios reported in the following examples are based on masses, all reagents used in the examples are commercially available or synthesized in a conventional manner, and can be used directly without further treatment, and all instruments used in the examples are commercially available.

Example 1

1. Preparation of Positive Electrode Plate

The positive electrode plate included a positive electrode current collector and a positive electrode film layer. The positive electrode current collector was a 10 μm thick aluminum foil. The positive electrode film layer included a film layer formed by applying a positive electrode slurry (solvent was N-methylpyrrolidone NMP) evenly on the surface of the positive electrode current collector aluminum foil, drying, and cold pressing. The positive electrode film layer included a positive electrode active material, a conductive agent carbon black, and a binder polyvinylidene fluoride (PVDF) at a weight ratio of 97.5:1.4:1.1.

The positive electrode active material was a single-crystal structure, including a compound with a molecular formula of $Li_dNi_aCO_bMn_cM_{(1-a-b-c)}O_z$, where the nickel cobalt manganese oxide matrix in the positive electrode active material included a compound with a molecular formula of $LiN_{i0.70}Co_{0.10}Mn_{0.20}O_2$.

The element M included 450 ppm element Ti, 1700 ppm element Zr, 1600 ppm element Al, and 120 ppm elements (B, S, and P).

2. Preparation of Negative Electrode Plate

The negative electrode plate included a negative electrode current collector and a negative electrode film layer. The negative electrode current collector was a 4.5 μm thick copper foil. The negative electrode film layer included a film layer formed by applying a negative electrode slurry (solvent was deionized water) evenly on the surface of the negative electrode current collector copper foil, drying, and cold pressing. The negative electrode film layer included a negative electrode active material, a binder styrene-butadiene rubber (SBR), a thickener sodium carboxymethyl cellulose (CMC-Na), and a conductive agent carbon black (Super P) at a weight ratio of 96.2:1.8:1.2:0.8.

The negative electrode active material included 97% artificial graphite and 3% silicon oxide SiO, with the mass percentage of the element silicon in the total mass of the negative electrode active material being 1.91%.

3. Separator

The separator could be directly purchased from Ningde Advanced Material Tech Co., Ltd. The separator had a porosity of 30% and included an organic substrate (porous polypropylene PP (7 μm)) and a coating. The coating included a ceramic layer (1 μm) and a polyacrylate layer (1 μm). The ceramic layer was provided on two surfaces of the organic substrate. The ceramic layer included a film layer formed by dissolving a binder and inorganic aluminum oxide in N-methylpyrrolidone NMP and applying the mixture on the organic substrate. The polyacrylate layer was provided on the surface of the ceramic layer facing away from the organic substrate. The polyacrylate layer was a film layer formed by applying a substance containing polyacrylate on the surface of the ceramic layer.

4. Preparation of Electrolyte

The electrolyte included an organic solvent, a lithium salt, and an additive. The organic solvent included cyclic carbonates (EC, PC, and BC, where these components were at a mass ratio of 1:1:1) and linear carbonates (EMC, DMC, and DEC, where these components were at a mass ratio of 1:1:1). The additive included fluorinated cyclic carbonate FEC, and further included at least one of PS, VC, and $LiSO_3F$, with a total percentage of ≤2%.

5. Preparation of Battery

The positive electrode plate, separator, and negative electrode plate were sequentially stacked so that the separator was located between the positive electrode plate and negative electrode plate for separation, and then wound to obtain an electrode assembly. The electrode assembly was placed into an outer package and dried, and the electrolyte was then injected in the outer package, followed by processes such as vacuum packaging, standing, formation, and shaping, to obtain a lithium-ion battery, where the lithium-ion battery had an electrolyte retention coefficient of 2.0 g/Ah.

Comparative Example 1

A lithium-ion battery was prepared in a method similar to that of Example 1, except that the negative electrode active material in Comparative Example 1 was different from that of Example 1. The negative electrode active material included 94% artificial graphite and 6% silicon oxide SiO, where the mass percentage of element silicon was 3.82%.

Comparative Example 2 and Comparative Example 3

A lithium-ion battery was prepared in a method similar to that of Example 1. The difference from Example 1 was that the components of the electrolyte, especially the percentage of the lithium hexafluorophosphate, were adjusted in Comparative Example 2 and Comparative Example 3.

Comparative Example 4

A lithium-ion battery was prepared in a method similar to that of Example 1. The difference from Example 1 was that the negative electrode active material of Comparative Example 4 was different, and the negative electrode active material included 100% artificial graphite.

Example 2-1 to Example 2-5

A lithium-ion battery was prepared in a method similar to that of Example 1. The difference from Example 1 was that at least the components of the negative electrode active material was adjusted in Example 2-1 to Example 2-5.

Example 3-1 to Example 3-3

A lithium-ion battery was prepared in a method similar to that of Example 1. The difference from Example 1 was that at least the components of the negative electrode active material was adjusted in Example 3-1 to Example 3-3.

Example 4 to Example 4-2

A lithium-ion battery was prepared in a method similar to that of Example 1. The difference from Example 1 was that at least the components of the electrolyte, especially the mass percentage of the lithium hexafluorophosphate, was adjusted in Example 4 to Example 4-2.

Example 5-1 to Example 5-7

A lithium-ion battery was prepared in a method similar to that of Example 1. The difference from Example 1 was that at least the components of the electrolyte, especially the mass percentage of at least one of the cyclic carbonate and the linear carbonate, was adjusted in Example 5-1 to Example 5-7.

Example 6-1 to Example 6-4

A lithium-ion battery was prepared in a method similar to that of Example 1. The difference from Example 1 was that at least the components of the electrolyte, especially the mass percentage of the fluorinated cyclic carbonate, was adjusted in Example 6-1 to Example 6-4.

Example 7

A lithium-ion battery was prepared in a method similar to that of Example 1. The difference from Example 1 was that at least the components of the electrolyte, especially the type of fluorinated cyclic carbonate, was adjusted to DFEC in Example 7. The DFEC contained two fluorine atoms and had relatively weak polarity, so it was more difficult to form a film than FEC.

Example 8-1 to Example 8-4

A lithium-ion battery was prepared in a method similar to that of Example 1. The difference from Example 1 was that at least the electrolyte retention coefficient was adjusted in Example 8-1 to Example 8-4.

Example 9-1 to Example 9-4

A lithium-ion battery was prepared in a method similar to that of Example 1. The difference from Example 1 was that at least one of thickness and porosity of the coating in the separator was adjusted in Example 9-1 to Example 9-4.

PP materials with different porosities were used in Example 9-3 and Example 9-4. The regulation of different porosities could adopt methods known to those skilled in the art.

Parameters of examples and comparative examples are shown in Table 1 to Table 3.

Performance Test

1. Test for Direct Current Internal Resistance DCR of Lithium-Ion Battery

Test Steps for Capacity:

In a 25° C. environment, the lithium-ion batteries prepared in the examples and comparative examples were first discharged to 2.8 V at 0.33 C, then charged to 4.35 V at 0.33 C, next charged to a current value less than 0.05 C at 4.35 V constant voltage, and discharged to 2.8 V at 0.33 C. The discharge capacity at this time was recorded as the true capacity D0 of the battery.

10% SOC Adjustment:

The lithium-ion batteries were charged at 0.1 C (C at this case was determined by the tested D0) for 6 minutes to adjust to 10% SOC, and the voltage at this point was recorded as U1. The batteries were discharged at a rate of 4 C for 10 s, and the voltage at this point was recorded as U2.

Direct current internal resistance DCR=(U1−U2)/I.

Test Results

The test results are shown in Table 1 to Table 3 below.

TABLE 1

| | Negative electrode active material | | | | | Separator | | |
| --- | --- | --- | --- | --- | --- | --- | --- | --- |
| | Carbon-based material | | Silicon-based material | | | Thickness of ceramic layer (μm) | Thickness of polyacrylate layer (μm) | Porosity |
| | Type | Percentage | Type | Percentage | Percentage of element silicon | | | |
| Comparative Example 1 | Artificial graphite | 94.00% | SiO | 6.00% | 3.82% | 1.00 | 1.00 | 30% |
| Comparative Example 2 | Artificial graphite | 97.00% | SiO | 3.00% | 1.91% | 1.00 | 1.00 | 30% |
| Comparative Example 3 | Artificial graphite | 97.00% | SiO | 3.00% | 1.91% | 1.00 | 1.00 | 30% |
| Comparative Example 4 | Artificial graphite | 100.00% | / | / | / | 1.00 | 1.00 | 30% |
| Example 1 | Artificial graphite | 97.00% | SiO | 3.00% | 1.91% | 1.00 | 1.00 | 30% |
| Example 2-1 | Artificial graphite | 99.50% | SiO | 0.50% | 0.32% | 1.00 | 1.00 | 30% |
| Example 2-2 | Artificial graphite | 99.00% | SiO | 1.00% | 0.64% | 1.00 | 1.00 | 30% |
| Example 2-3 | Artificial graphite | 98.00% | SiO | 2.00% | 1.27% | 1.00 | 1.00 | 30% |

TABLE 1-continued

|  | Negative electrode active material | | | | Separator | | |
|---|---|---|---|---|---|---|---|
|  | Carbon-based material | | Silicon-based material | | Thickness of ceramic layer (μm) | Thickness of polyacrylate layer (μm) | Porosity |
|  | Type | Percentage | Type | Percentage | Percentage of element silicon | | | |
| Example 2-4 | Artificial graphite | 96.50% | SiO | 3.50% | 2.23% | 1.00 | 1.00 | 30% |
| Example 2-5 | Artificial graphite | 95.50% | SiO | 4.50% | 2.86% | 1.0 | 1.00 | 30% |
| Example 3-1 | Natural graphite | 97.00% | SiO | 3.00% | 1.91% | 1.00 | 1.00 | 30% |
| Example 3-2 | Artificial graphite | 95.91% | SiO2 | 4.09% | 1.91% | 1.00 | 1.00 | 30% |
| Example 3-3 | Artificial graphite | 98.09% | Si | 1.91% | 1.91% | 1.00 | 1.00 | 30% |
| Example 4 | Artificial graphite | 97.00% | SiO | 3.00% | 1.91% | 1.00 | 1.00 | 30% |
| Example 4-1 | Artificial graphite | 97.00% | SiO | 3.00% | 1.91% | 1.00 | 1.00 | 30% |
| Example 4-2 | Artificial graphite | 97.00% | SiO | 3.00% | 1.91% | 1.00 | 1.00 | 30% |
| Example 5-1 | Artificial graphite | 97.00% | SiO | 3.00% | 1.91% | 1.00 | 1.00 | 30% |
| Example 5-2 | Artificial graphite | 97.00% | SiO | 3.00% | 1.91% | 1.00 | 1.00 | 30% |
| Example 5-3 | Artificial graphite | 97.00% | SiO | 3.00% | 1.91% | 1.00 | 1.00 | 30% |
| Example 5-4 | Artificial graphite | 97.00% | SiO | 3.00% | 1.91% | 1.00 | 1.00 | 30% |
| Example 5-5 | Artificial graphite | 97.00% | SiO | 3.00% | 1.91% | 1.00 | 1.00 | 30% |
| Example 5-6 | Artificial graphite | 97.00% | SiO | 3.00% | 1.91% | 1.00 | 1.00 | 30% |
| Example 5-7 | Artificial graphite | 97.00% | SiO | 3.00% | 1.91% | 1.00 | 1.00 | 30% |
| Example 6-1 | Artificial graphite | 97.00% | SiO | 3.00% | 1.91% | 1.00 | 1.00 | 30% |
| Example 6-2 | Artificial graphite | 97.00% | SiO | 3.00% | 1.91% | 1.00 | 1.00 | 30% |
| Example 6-3 | Artificial graphite | 97.00% | SiO | 3.00% | 1.91% | 1.00 | 1.00 | 30% |
| Example 6-4 | Artificial graphite | 97.00% | SiO | 3.00% | 1.91% | 1.00 | 1.00 | 30% |
| Example 7 | Artificial graphite | 97.00% | SiO | 3.00% | 1.91% | 1.00 | 1.00 | 30% |
| Example 8-1 | Artificial graphite | 97.00% | SiO | 3.00% | 1.91% | 1.00 | 1.00 | 30% |
| Example 8-2 | Artificial graphite | 97.00% | SiO | 3.00% | 1.91% | 1.00 | 1.00 | 30% |
| Example 8-3 | Artificial graphite | 97.00% | SiO | 3.00% | 1.91% | 1.00 | 1.00 | 30% |
| Example 8-4 | Artificial graphite | 97.00% | SiO | 3.00% | 1.91% | 1.00 | 1.00 | 30% |
| Example 9-1 | Artificial graphite | 97.00% | SiO | 3.00% | 1.91% | 1.50 | 1.00 | 29% |
| Example 9-2 | Artificial graphite | 97.00% | SiO | 3.00% | 1.91% | 1.00 | 0.50 | 32% |
| Example 9-3 | Artificial graphite | 97.00% | SiO | 3.00% | 1.91% | 1.00 | 1.00 | 35% |
| Example 9-4 | Artificial graphite | 97.00% | SiO | 3.00% | 1.91% | 1.00 | 1.00 | 40% |

TABLE 2

| | Electrolyte | | | | | | | | | Additive | | | |
|---|---|---|---|---|---|---|---|---|---|---|---|---|---|
| | Lithium salt | | | | Organic solvent | | | | | Ratio of percentage of fluorinated cyclic carbonate to percentage of element silicon | Ratio of percentage of fluorinated cyclic carbonate to percentage of lithium salt | Electrolyte retention coefficient (g/Ah) | DCR value of battery in 10% SOC |
| | Percentage of LiPF$_6$ | Percentage of fluorine-containing inorganic phosphate LiPO$_2$F$_2$ | Percentage of fluorine-containing inorganic borate LiDFOB | Percentage of fluorine-containing inorganic borate LiBF$_4$ | Percentage of cyclic carbonate | Ratio of percentage of cyclic carbonate to percentage of LiPF$_6$ | Percentage of linear carbonate | Ratio of percentage of linear carbonate to percentage of cyclic carbonate | Percentage of fluorinated cyclic carbonate | | | | |
| Comparative Example 1 | 18.20% | 0.01% | 0.20% | 0.10% | 25.00% | 1.37 | 48.80% | 1.95 | 5.99% | 1.57 | 0.33 | 2.00 | 29.9 |
| Comparative Example 2 | 12.00% | 0.01% | 0.20% | 0.10% | 25.00% | 2.08 | 57.99% | 2.32 | 3.00% | 1.57 | 0.25 | 2.00 | 30.1 |
| Comparative Example 3 | 23.00% | 0.01% | 0.20% | 0.10% | 25.00% | 1.09 | 46.99% | 1.88 | 3.00% | 1.57 | 0.13 | 2.00 | 32.2 |
| Comparative Example 4 | 18.20% | 0.01% | 0.20% | 0.10% | 25.00% | 1.39 | 51.79% | 2.07 | 3.00% | / | 0.16 | 2.00 | 35.7 |
| Example 1 | 18.20% | 0.50% | 0.20% | 0.10% | 25.00% | 1.37 | 51.30% | 2.05 | 3.00% | 1.57 | 0.16 | 2.00 | 20.8 |
| Example 2-1 | 18.20% | 0.50% | 0.20% | 0.10% | 25.00% | 1.37 | 51.30% | 2.05 | 3.00% | 9.43 | 0.16 | 2.00 | 23.6 |
| Example 2-2 | 18.20% | 0.50% | 0.20% | 0.10% | 25.00% | 1.37 | 51.30% | 2.05 | 3.00% | 4.71 | 0.16 | 2.00 | 23.1 |
| Example 2-3 | 18.20% | 0.50% | 0.20% | 0.10% | 25.00% | 1.37 | 51.30% | 2.05 | 3.00% | 2.36 | 0.16 | 2.00 | 22.1 |
| Example 2-4 | 18.20% | 0.50% | 0.20% | 0.10% | 25.00% | 1.37 | 51.30% | 2.05 | 3.00% | 1.35 | 0.16 | 2.00 | 21.4 |
| Example 2-5 | 18.20% | 0.50% | 0.20% | 0.10% | 25.00% | 1.37 | 51.30% | 2.05 | 3.00% | 1.05 | 0.16 | 2.00 | 23.8 |
| Example 3-1 | 18.20% | 0.50% | 0.20% | 0.10% | 25.00% | 1.37 | 51.30% | 2.05 | 3.00% | 1.57 | 0.16 | 2.00 | 20.6 |
| Example 3-2 | 18.20% | 0.50% | 0.20% | 0.10% | 25.00% | 1.37 | 51.30% | 2.05 | 3.00% | 1.57 | 0.16 | 2.00 | 21.4 |
| Example 3-3 | 18.20% | 0.50% | 0.20% | 0.10% | 25.00% | 1.37 | 51.30% | 2.05 | 3.00% | 1.57 | 0.16 | 2.00 | 21.7 |
| Example 4 | 15.00% | 0.20% | 0.20% | 0.10% | 25.00% | 1.67 | 54.80% | 2.19 | 3.00% | 1.57 | 0.19 | 2.00 | 21.3 |
| Example 4-1 | 15.00% | 0.70% | 0.20% | 0.10% | 25.00% | 1.67 | 54.30% | 2.17 | 3.00% | 1.57 | 0.19 | 2.00 | 21.3 |
| Example 4-2 | 20.00% | 0.05% | 0.20% | 0.05% | 24.00% | 1.20 | 50.95% | 2.12 | 3.00% | 1.57 | 0.15 | 2.00 | 22.5 |
| Example 5-1 | 18.20% | 0.50% | 0.20% | 0.10% | 10.92% | 0.60 | 65.38% | 5.99 | 3.00% | 1.57 | 0.16 | 2.00 | 22.1 |
| Example 5-2 | 18.20% | 0.50% | 0.20% | 0.10% | 20.93% | 1.15 | 55.37% | 2.65 | 3.00% | 1.57 | 0.16 | 2.00 | 21.5 |
| Example 5-3 | 18.20% | 0.50% | 0.20% | 0.10% | 23.66% | 1.30 | 52.64% | 2.22 | 3.00% | 1.57 | 0.16 | 2.00 | 21.2 |

TABLE 3

| | Electrolyte | | | | | | | | | Additive | | | |
|---|---|---|---|---|---|---|---|---|---|---|---|---|---|
| | Lithium salt | | | | Organic solvent | | | | | Ratio of percentage of fluorinated cyclic carbonate to percentage of element silicon | Ratio of percentage of fluorinated cyclic carbonate to percentage of lithium salt | Electrolyte retention coefficient (g/Ah) | DCR value of battery in 10% SOC |
| | Percentage of LiPF$_6$ | Percentage of fluorine-containing inorganic phosphate LiPO$_2$F$_2$ | Percentage of fluorine-containing inorganic borate LiDFOB | Percentage of fluorine-containing inorganic borate LiBF$_4$ | Percentage of cyclic carbonate | Ratio of percentage of cyclic carbonate to percentage of LiPF$_6$ | Percentage of linear carbonate | Ratio of percentage of linear carbonate to percentage of cyclic carbonate | Percentage of fluorinated cyclic carbonate | | | | |
| Example 5-4 | 18.20% | 0.50% | 0.20% | 0.10% | 29.12% | 1.60 | 47.18% | 1.62 | 3.00% | 1.57 | 0.16 | 2.00 | 20.9 |
| Example 5-5 | 18.20% | 0.50% | 0.20% | 0.10% | 30.03% | 1.65 | 46.27% | 1.54 | 3.00% | 1.57 | 0.16 | 2.00 | 21.9 |
| Example 5-6 | 18.20% | 0.50% | 0.20% | 0.10% | 36.40% | 2.00 | 39.90% | 1.10 | 3.00% | 1.57 | 0.16 | 2.00 | 22.3 |
| Example 5-7 | 18.20% | 0.50% | 0.20% | 0.10% | 40.04% | 2.20 | 36.26% | 0.91 | 3.00% | 1.57 | 0.16 | 2.00 | 22.5 |
| Example 6-1 | 18.20% | 0.50% | 0.20% | 0.10% | 25.00% | 1.37 | 53.35% | 2.13 | 0.95% | 0.50 | 0.05 | 2.00 | 22.9 |
| Example 6-2 | 18.20% | 0.50% | 0.20% | 0.10% | 25.00% | 1.37 | 52.39% | 2.10 | 1.91% | 1.00 | 0.10 | 2.00 | 21.0 |
| Example 6-3 | 18.20% | 0.50% | 0.20% | 0.10% | 25.00% | 1.37 | 50.48% | 2.02 | 3.82% | 2.00 | 0.20 | 2.00 | 21.1 |

TABLE 3-continued

| | Electrolyte | | | | | | | | | | | | |
|---|---|---|---|---|---|---|---|---|---|---|---|---|---|
| | Lithium salt | | | | Organic solvent | | | | | Additive | | | |
| | | | | | | | | | | Ratio of | Ratio of | | |
| | Percentage of $LiPF_6$ | Percentage of fluorine-containing inorganic phosphate $LiPO_2F_2$ | Percentage of fluorine-containing inorganic borate LiDFOB | Percentage of fluorine-containing inorganic borate $LiBF_4$ | Percentage of cyclic carbonate | Ratio of percentage of cyclic carbonate to percentage of $LiPF_6$ | Percentage of linear carbonate | Ratio of percentage of linear carbonate to percentage of cyclic carbonate | Percentage of fluorinated cyclic carbonate | percentage of fluorinated cyclic carbonate to percentage of element silicon | percentage of fluorinated cyclic carbonate to percentage of lithium salt | Electrolyte retention coefficient (g/Ah) | DCR value of battery in 10% SOC |
| Example 6-4 | 18.20% | 0.50% | 0.20% | 0.10% | 25.00% | 1.37 | 48.57% | 1.94 | 5.73% | 3.00 | 0.30 | 2.00 | 22.8 |
| Example 7 | 18.20% | 0.50% | 0.20% | 0.10% | 25.00% | 1.37 | 51.30% | 2.05 | 3.00% | 1.57 | 0.16 | 2.00 | 21.3 |
| Example 8-1 | 18.20% | 0.50% | 0.20% | 0.10% | 25.00% | 1.37 | 51.30% | 2.05 | 3.00% | 1.57 | 0.16 | 1.00 | 22.9 |
| Example 8-2 | 18.20% | 0.50% | 0.20% | 0.10% | 25.00% | 1.37 | 51.30% | 2.05 | 3.00% | 1.57 | 0.16 | 1.80 | 20.9 |
| Example 8-3 | 18.20% | 0.50% | 0.20% | 0.10% | 25.00% | 1.37 | 51.30% | 2.05 | 3.00% | 1.57 | 0.16 | 2.20 | 21.0 |
| Example 8-4 | 18.20% | 0.50% | 0.20% | 0.10% | 25.00% | 1.37 | 51.30% | 2.05 | 3.00% | 1.57 | 0.16 | 2.50 | 23.1 |
| Example 9-1 | 18.20% | 0.50% | 0.20% | 0.10% | 25.00% | 1.37 | 51.30% | 2.05 | 3.00% | 1.57 | 0.16 | 2.00 | 21.3 |
| Example 9-2 | 18.20% | 0.50% | 0.20% | 0.10% | 25.00% | 1.37 | 51.30% | 2.05 | 3.00% | 1.57 | 0.16 | 2.00 | 20.6 |
| Example 9-3 | 18.20% | 0.50% | 0.20% | 0.10% | 25.00% | 1.37 | 51.30% | 2.05 | 3.00% | 1.57 | 0.16 | 2.00 | 20.4 |
| Example 9-4 | 18.20% | 0.50% | 0.20% | 0.10% | 25.00% | 1.37 | 51.30% | 2.05 | 3.00% | 1.57 | 0.16 | 2.00 | 20.2 |

It can be learned from Table 1 to Table 3 that:

Comparative Example 1 and Comparative Example 4 both use a suitable electrolyte system, but the mass percentage of the element silicon in Comparative Example 1 is relatively high. Even if the system contains a relatively high percentage of the lithium hexafluorophosphate, the volume expansion of the silicon-based material cannot be well alleviated. The risk of structural collapse, cracking, and pulverization of the silicon-based material is relatively high, which is not conducive to improving DCR and leads to a relatively poor discharge power of the battery. Comparative Example 4 uses artificial graphite as the negative electrode active material. At low SOC, the artificial graphite is difficult to participate in the discharge, which easily leads to insufficient discharge, resulting in poor discharge power.

Comparative Example 2 and Comparative Example 3 both use appropriate silicon material systems. However, Comparative Example 2 uses a relatively low percentage of the lithium hexafluorophosphate (12%). The low percentage of the lithium hexafluorophosphate generates relatively few fluorine-lithium compounds on the surface of the negative electrode active material, which cannot effectively alleviate the problem of cracking and pulverization of the silicon-based material. Comparative Example 3 uses a relatively high percentage of the lithium hexafluorophosphate (23%). Although the high percentage of the lithium hexafluorophosphate can effectively alleviate the volume expansion of the silicon-based material, the lithium hexafluorophosphate causes the viscosity of the electrolyte system to be too high, which is not conducive to the migration of lithium ions from the negative electrode surface to the positive electrode surface. In the later stage of discharge, it is difficult to increase the discharge power.

Compared with Comparative Example 1 to Comparative Example 4, in Example 1, the internal resistance of the battery is reduced at the end of discharge and the discharge power performance is improved by regulating the percentage of silicon in the negative electrode active material (the mass percentage of the element silicon is not less than 0.3% and less than or equal to 3.0%) and matching a suitable electrolyte system (the mass percentage of the lithium hexafluorophosphate ranges from 15% to 20%).

With the change of percentage of the element silicon, the discharge power of the battery has a certain influence. When the percentage of the element silicon is relatively low, the negative electrode active material participated in the later discharge is relatively small, which is not conducive to the improvement of the discharge power of the battery. When the percentage of the element silicon is relatively high, the adverse effect of volume expansion gradually manifests. Therefore, selecting a suitable percentage of element silicon is more conducive to the improvement of the discharge power of the battery. For example, the mass percentage of the element silicon is not less than 0.3% and less than or equal to 3.0%, which can significantly improve the improvement of the discharge power of the battery. The materials of the silicon-based material and carbon-based material also have a certain influence on the discharge power. The components of the electrolyte also have a certain influence on the discharge power.

Although illustrative embodiments have been demonstrated and described, persons skilled in the art should understand that the foregoing embodiments cannot be construed as limitations on this application, and that the embodiments may be changed, replaced, and modified without departing from the spirit, principle, and scope of this application.

What is claimed is:

1. A battery cell, comprising:
an electrolyte, comprising a lithium salt, wherein the lithium salt comprises lithium hexafluorophosphate, and a mass percentage of the lithium hexafluorophosphate with respect to a total mass of the electrolyte ranges from 15% to 20%;
a positive electrode plate, comprising a positive electrode current collector and a positive electrode film layer provided on at least one side of the positive electrode current collector and containing a positive electrode active material;
a negative electrode plate, comprising a negative electrode current collector and a negative electrode film layer provided on at least one side of the negative electrode current collector and containing a negative electrode active material, wherein the negative electrode active material further contains element carbon and element silicon, and a mass percentage of the element silicon with respect to a total mass of the negative electrode active material is greater than or equal to 0.3% and less than or equal to 3.0%; and
a separator, provided between the positive electrode plate and the negative electrode plate.

2. The battery cell according to claim 1, wherein the element silicon in the negative electrode active material exists in the negative electrode film layer in a form of at least one of silicon elementary substance, silicon-carbon composite, and silicon oxide $SiO_x$, wherein $0<x\leq2$.

3. The battery cell according to claim 1, wherein the negative electrode active material further comprises at least one of artificial graphite and natural graphite containing element carbon.

4. The battery cell according to claim 1, wherein:
the element silicon in the negative electrode active material exists in the negative electrode film layer in a form of silicon oxide $SiO_x$, wherein $x=1$; and
the negative electrode active material further comprises artificial graphite containing element carbon.

5. The battery cell according to claim 4, wherein based on the total mass of the negative electrode active material:
a ratio of a mass percentage of the silicon oxide $SiO_x$ to a mass percentage of the artificial graphite ranges from (0.50:99.5) to (5:95); and/or
the mass percentage of the silicon oxide $SiO_x$ ranges from 2.0% to 3.5%.

6. The battery cell according to claim 1, wherein the electrolyte further comprises a cyclic carbonate, wherein based on the total mass of the electrolyte, a ratio of a mass percentage of the cyclic carbonate to the mass percentage of the lithium hexafluorophosphate is (0.60 to 2.50):1.

7. The battery cell according to claim 6, wherein:
the ratio of the mass percentage of the cyclic carbonate to the mass percentage of the lithium hexafluorophosphate is (1.00 to 1.65):1; and/or
the mass percentage of the cyclic carbonate ranges from 20% to 30%.

8. The battery cell according to claim 6, wherein:
the mass percentage of the cyclic carbonate ranges from 10% to 41%; and/or
the cyclic carbonate comprises at least one of ethylene carbonate EC, propylene carbonate PC, and butylene carbonate BC.

9. The battery cell according to claim 6, wherein:
the electrolyte further comprises a linear carbonate; and based on the total mass of the electrolyte, a ratio of a mass percentage of the linear carbonate to the mass percentage of the cyclic carbonate is (0.9 to 6):1.

10. The battery cell according to claim 9, wherein the ratio of the mass percentage of the linear carbonate to the mass percentage of the cyclic carbonate is (1.5 to 2.65):1.

11. The battery cell according to claim 9, wherein:
the mass percentage of the linear carbonate ranges from 35% to 65%; and/or
the linear carbonate comprises at least one of ethyl methyl carbonate EMC, diethyl carbonate DEC, and dimethyl carbonate DMC.

12. The battery cell according to claim 1, wherein the electrolyte further comprises a fluorinated cyclic carbonate.

13. The battery cell according to claim 12, wherein the fluorinated cyclic carbonate comprises at least one of monofluoroethylene carbonate FEC, difluoroethylene carbonate DFEC, and trifluoropropylene carbonate TFPC.

14. The battery cell according to claim 13, wherein:
the fluorinated cyclic carbonate comprises monofluoroethylene carbonate FEC; and/or
a ratio of a mass percentage of the fluorinated cyclic carbonate with respect to the total mass of the electrolyte to the mass percentage of the element silicon with respect to the total mass of the negative electrode active material is (0.5 to 9.5):1.

15. The battery cell according to claim 12, wherein a ratio of the mass percentage of the fluorinated cyclic carbonate with respect to the total mass of the electrolyte to the mass percentage of the element silicon with respect to the total mass of the negative electrode active material is (1 to 2):1.

16. The battery cell according to claim 12, wherein based on the total mass of the electrolyte, a ratio of a mass percentage of the fluorinated cyclic carbonate to a mass percentage of the lithium salt is (0.05 to 0.30):1.

17. The battery cell according to claim 16, wherein based on the total mass of the electrolyte, the ratio of the mass percentage of the fluorinated cyclic carbonate to the mass percentage of the lithium salt is (0.10 to 0.20):1.

18. A battery, comprising the battery cell according to claim 1.

19. A battery cell, comprising:
an electrolyte, comprising a lithium salt, wherein the lithium salt comprises lithium hexafluorophosphate, and a mass percentage of the lithium hexafluorophosphate with respect to a total mass of the electrolyte ranges from 15% to 20%;
a positive electrode plate, comprising a positive electrode current collector and a positive electrode film layer provided on at least one side of the positive electrode current collector and containing a positive electrode active material, and a thickness of the positive electrode current collector being in a range from 8 µm to 10 µm;
a negative electrode plate, comprising a negative electrode current collector and a negative electrode film layer provided on at least one side of the negative electrode current collector and containing a negative electrode active material, wherein the negative electrode active material further contains element carbon and element silicon, and a mass percentage of the element silicon with respect to a total mass of the negative electrode active material is greater than or equal to 0.3% and less than or equal to 3.0%; and a separator, provided between the positive electrode plate and the negative electrode plate.

20. A battery cell, comprising:

an electrolyte, comprising a lithium salt and a fluorinated cyclic carbonate, wherein the lithium salt comprises lithium hexafluorophosphate, and a mass percentage of the lithium hexafluorophosphate with respect to a total mass of the electrolyte ranges from 15% to 20%;

a positive electrode plate, comprising a positive electrode current collector and a positive electrode film layer provided on at least one side of the positive electrode current collector and containing a positive electrode active material;

a negative electrode plate, comprising a negative electrode current collector and a negative electrode film layer provided on at least one side of the negative electrode current collector and containing a negative electrode active material, wherein the negative electrode active material further contains element carbon and element silicon, a mass percentage of the element silicon with respect to a total mass of the negative electrode active material is greater than or equal to 0.3% and less than or equal to 3.0%, and a ratio of a mass percentage of the fluorinated cyclic carbonate with respect to the total mass of the electrolyte to the mass percentage of the element silicon with respect to the total mass of the negative electrode active material is (0.5 to 9.5):1; and a separator, provided between the positive electrode plate and the negative electrode plate.

* * * * *